(12) United States Patent
Sezi et al.

(10) Patent No.: US 7,244,803 B2
(45) Date of Patent: *Jul. 17, 2007

(54) POLY-O-HYDROXYAMIDE, POLYBENZOXAZOLE FROM THE POLY-O-HYDROXYAMIDE, ELECTRONIC COMPONENT INCLUDING A POLYBENZOXAZOLE, AND PROCESSES FOR PRODUCING THE SAME

(75) Inventors: Recai Sezi, Röttenbach (DE); Andreas Walter, Egloffstein (DE); Anna Maltenberger, Leutenbach (DE); Klaus Lowack, Erlangen (DE); Marcus Halik, Erlangen (DE)

(73) Assignee: Infineon Technologies AG, Munich (DE)

( * ) Notice: Subject to any disclaimer, the term of this patent is extended or adjusted under 35 U.S.C. 154(b) by 512 days.

This patent is subject to a terminal disclaimer.

(21) Appl. No.: 10/609,453

(22) Filed: Jun. 27, 2003

(65) Prior Publication Data

US 2004/0082756 A1    Apr. 29, 2004

(30) Foreign Application Priority Data

Jun. 27, 2002  (DE) ................................ 102 28 769

(51) Int. Cl.
*C08G 63/44*    (2006.01)
*C08G 73/22*    (2006.01)

(52) U.S. Cl. ...................... 528/176; 528/362; 528/363; 528/327; 528/272; 528/288; 528/332; 428/457; 428/458; 428/473.5; 428/411.1; 525/420; 525/422; 525/434

(58) Field of Classification Search ................ 528/363, 528/327, 362, 176, 272, 288, 332, 480; 257/750; 525/420, 422, 434, 424; 438/404, 405, 174; 428/457, 458, 474.5, 411.1, 473.5
See application file for complete search history.

(56) References Cited

U.S. PATENT DOCUMENTS

| 5,760,162 A | * | 6/1998 | Sezi et al. .................. 528/310 |
| 6,235,436 B1 | | 5/2001 | Hirano et al. |
| 6,806,344 B2 | * | 10/2004 | Sezi et al. .................. 528/176 |
| 6,900,284 B2 | * | 5/2005 | Lowack et al. ............. 528/327 |
| 2002/0010370 A1 | | 1/2002 | Haussmann et al. |
| 2002/0086968 A1 | | 7/2002 | Haussmann et al. |
| 2003/0064568 A1 | * | 4/2003 | Giffard et al. ............. 438/404 |
| 2003/0176623 A1 | | 9/2003 | Lowack et al. |
| 2004/0063895 A1 | | 4/2004 | Sezi et al. |

FOREIGN PATENT DOCUMENTS

| CN | 1 468 839 | 1/2004 |
| DE | 100 11 604 A1 | 10/2001 |
| DE | 100 11 608 A1 | 10/2001 |
| DE | 101 47 927 C1 | 3/2003 |
| EP | 0 765 894 A2 | 4/1997 |
| EP | 0 997 488 A1 | 5/2000 |
| JP | 2004-018593 | 1/2004 |

OTHER PUBLICATIONS

V. V. Korshak et al.: "Effect of the structure of some polybenzoxazoles on their properties", *Visokomolekulyarnye Soedineniya*, Serya A, Russia, 1969, 11(1), pp. 11-15.

* cited by examiner

*Primary Examiner*—Irina S. Zemel
(74) *Attorney, Agent, or Firm*—Laurence A. Greenberg; Werner H. Stemer; Ralph E. Locher

(57) ABSTRACT

A dielectric for aluminum and copper metalizations is stable at high temperatures. Surprisingly, in spite of the elimination of water during the cyclization, the polymeric dielectrics are very suitable for filling narrow trenches. The filled trenches exhibit no defects and bubbles or cracks. The polybenzoxazoles have dielectric constants of $k \leq 2.7$ and are suitable as an electrical insulator. Furthermore, these materials adhere very well on all surfaces relevant for micro-electronics.

13 Claims, 3 Drawing Sheets

POLY-O-HYDROXYAMIDE, POLYBENZOXAZOLE FROM THE POLY-O-HYDROXYAMIDE, ELECTRONIC COMPONENT INCLUDING A POLYBENZOXAZOLE, AND PROCESSES FOR PRODUCING THE SAME

BACKGROUND OF THE INVENTION

Field of the Invention

The invention relates to a poly-o-hydroxyamide, a polybenzoxazole from the poly-o-hydroxyamide, an electronic component including a polybenzoxazole, and processes for producing the same.

In order to avoid an inductive disturbance of signals that is caused by capacitive coupling, conductor tracks adjacent one another in microchips are insulated from one another by a dielectric disposed between the conductor tracks. Materials that are to be used as a dielectric must meet various requirements. Thus, the signal transit time in microchips depends both on the material of the conductor track and on the dielectric that is disposed between the conductor tracks. The lower the dielectric constant of the dielectric, the shorter, too, is the signal transit time. The silica-based dielectrics used to date have a dielectric constant of about 4. These materials are gradually being replaced by organic dielectrics that have a substantially lower dielectric constant. The dielectric constant of these materials is generally below 3.

In the microchips customary at present, the conductor tracks preferably are made of aluminum, AlCu, or AlCuSi. With increasing integration density of the memory chips, there is a changeover to copper as conductor track material, owing to its lower electrical resistance in comparison with aluminum. Copper permits shorter signal transit times and hence a reduction in the conductor track cross section. In contrast to the techniques customary to date, in which the dielectric is filled into the trenches between the conductor tracks, in the copper.damascene technique the dielectric is first structured. The resulting trenches are first coated with a very thin barrier that includes, for example, titanium, titanium nitride, tantalum, tantalum nitride, silicon carbide, silicon nitride, or silicon carbonitride. Thereafter, the trenches are first filled with copper and then excess copper is mechanically ground away. The dielectric must therefore be stable to the materials used for grinding and must have sufficient adhesion to the substrate in order not to become detached during the mechanical grinding process. Furthermore, the dielectrics must also have sufficient stability in the subsequent process steps in which further components of the microchips are produced. For this purpose, they must, for example, have sufficient thermal stability and must not undergo decomposition even at temperatures of more than 400° C. Moreover, the dielectrics must be stable to process chemicals, such as solvents, strippers, bases, acids or aggressive gases. Further requirements are good solubility and a sufficient shelf-life of the precursors from which the dielectrics are produced.

Polybenzoxazoles (PBOs) are polymers that have very high heat resistance. The substances are already used for the production of protective and insulating layers in microchips. Polybenzoxazoles can be prepared by cyclization of poly-o-hydroxyamides. The poly-o-hydroxyamides have good solubility in organic solvents and good film formation properties. They can be applied to electronic components in a simple manner by using the spin-coating technique. After a thermal treatment in which the poly-o-hydroxyamide is cyclized to give the polybenzoxazole, a polymer that has the desired properties is obtained. Polybenzoxazoles also can be processed directly in their cyclized form. In this case, however, the polymer may present difficulties with regard to solubility. Building blocks for poly-o-hydroxyamides are described, for example, in German published, non-prosecuted patent application DE 100 11 608 A1, which corresponds to U.S. Pat. No. 6,531,632.

In order to be able to house as large a number of components as possible on the surface of a microchip, the components must have as small a space requirement as possible on the chip surface. In order nevertheless to be able to ensure sufficient operability of the components, increasing use is made of the depth of the substrate, i.e. the components have a small area at the chip surface while their dimension perpendicular to the chip surface increases. In the production of the microchips, it is therefore increasingly necessary to process trenches having a high aspect ratio. Thus, for example, the dielectric must also be capable of being filled without formation of bubbles or cracks in narrow and deep trenches. The aspect ratios of the trenches to be filled may be up to more than 4, the width of the trenches being, for example, only from 100 nm to 200 nm.

SUMMARY OF THE INVENTION

It is accordingly an object of the invention to provide a poly-o-hydroxyamide, a polybenzoxazole from the poly-o-hydroxyamide, an electronic component including a polybenzoxazole, and processes for producing the same that overcome the hereinafore-mentioned disadvantages of the heretofore-known devices of this general type and that can be readily applied to electronic components and that have a very good electronic insulation effect after their cyclization, and exhibit sufficient stability to chemicals and high temperatures and good adhesion and filling properties.

With the foregoing and other objects in view, there is provided, in accordance with the invention, a poly-o-hydroxyamide having a formula I:

Formula I

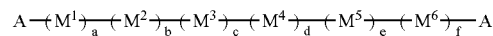

wherein
M$^1$ is

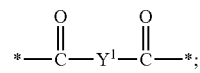

M$^2$ is

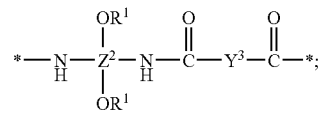

$M^3$, $M^4$, and $M^5$, in each case independently, are
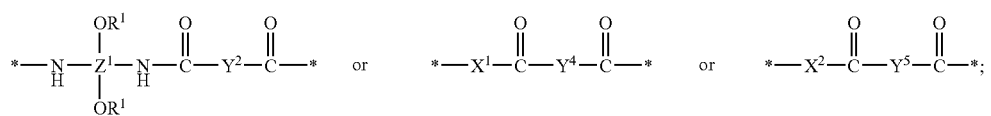
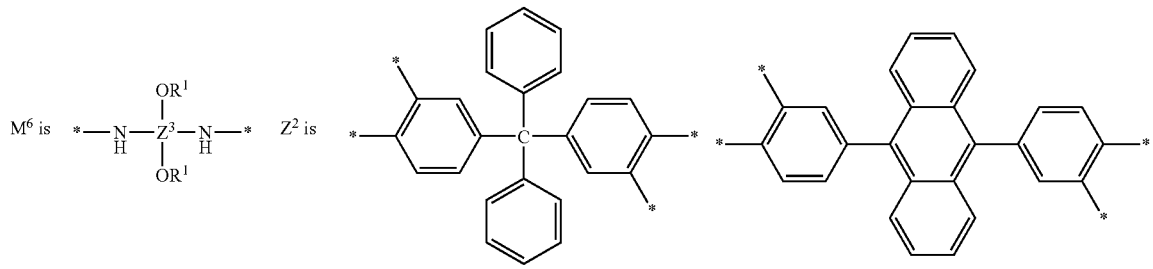
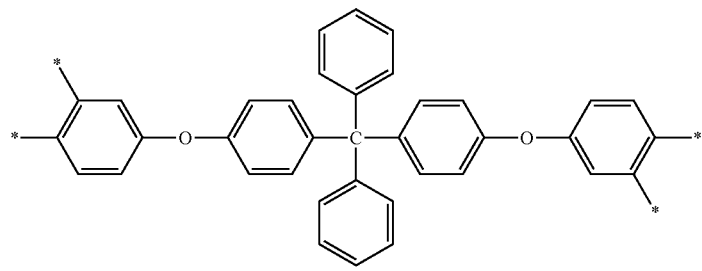
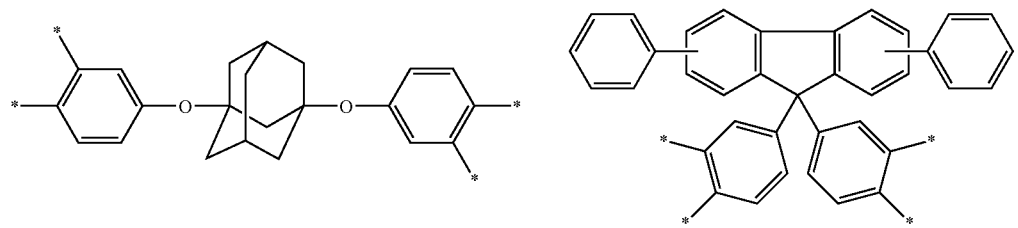
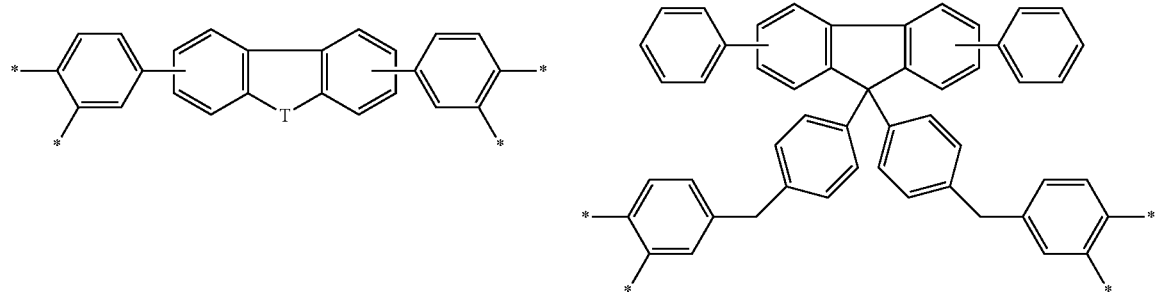
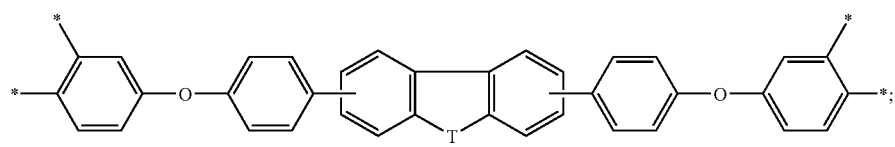

$Z^1$ and $Z^3$, in each case independently, have the same meaning as stated for $Z^2$, and are furthermore
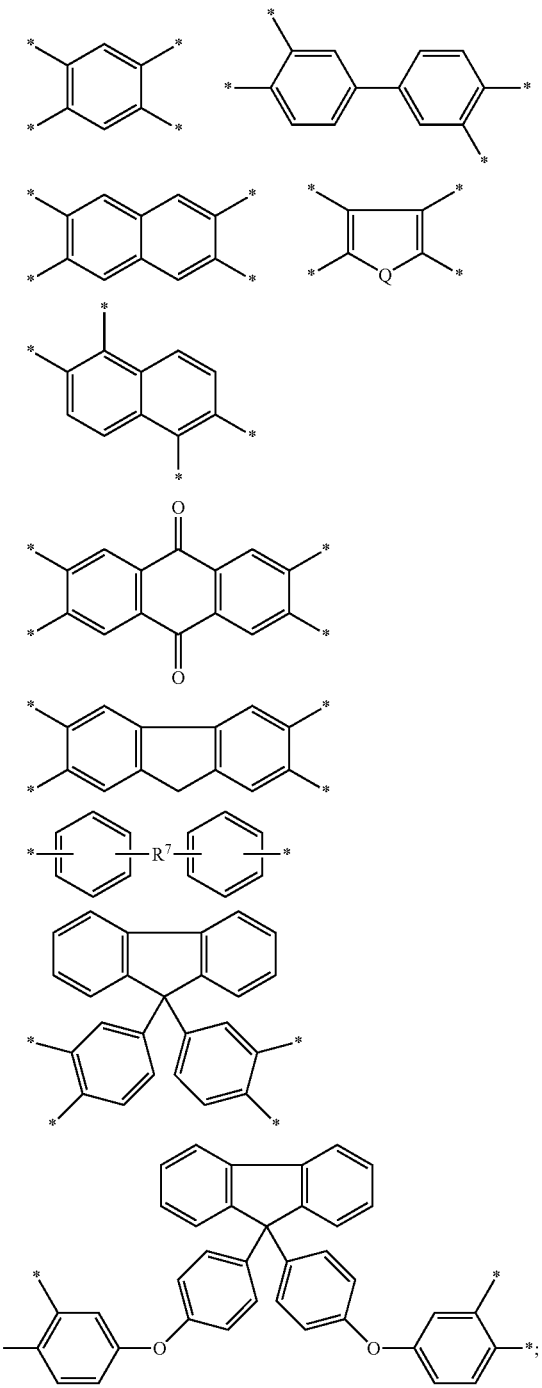
$Y^1$, $Y^2$, $Y^3$, $Y^4$, and $Y^5$ are
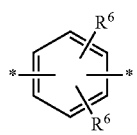 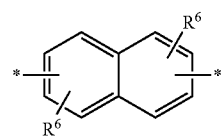
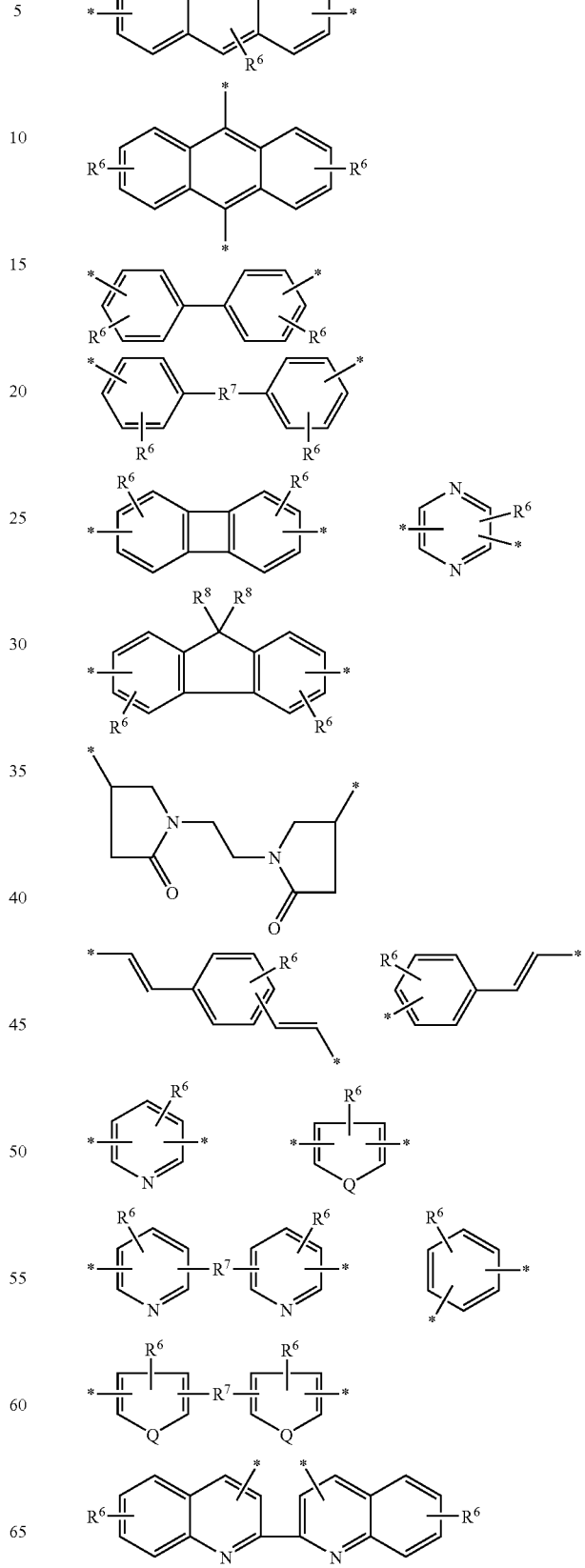

-continued
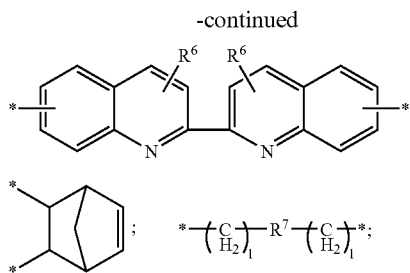
$X^1$ and $X^2$, in each case independently, are
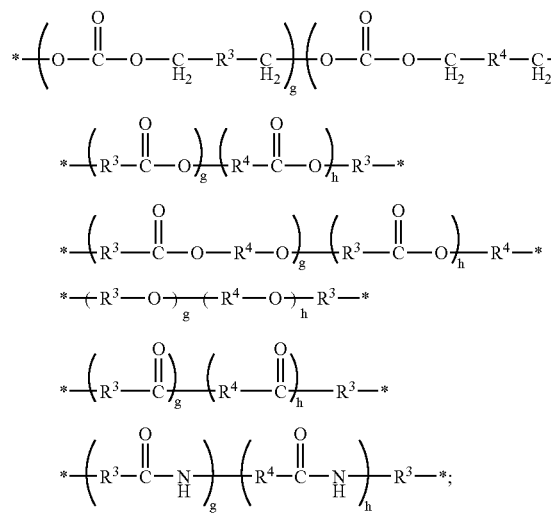
T is
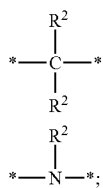
A, if a=0 and/or f=1, is
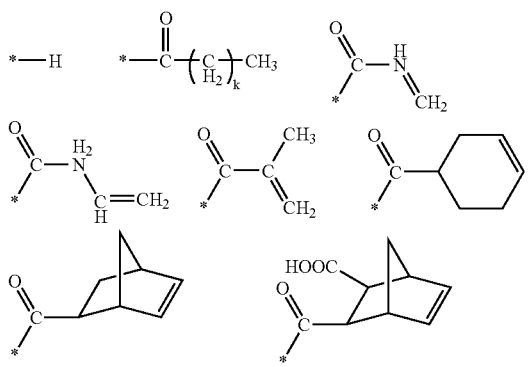
-continued
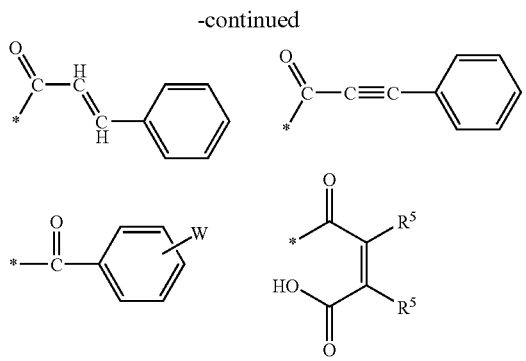
if a=1 and/or f=0, A is
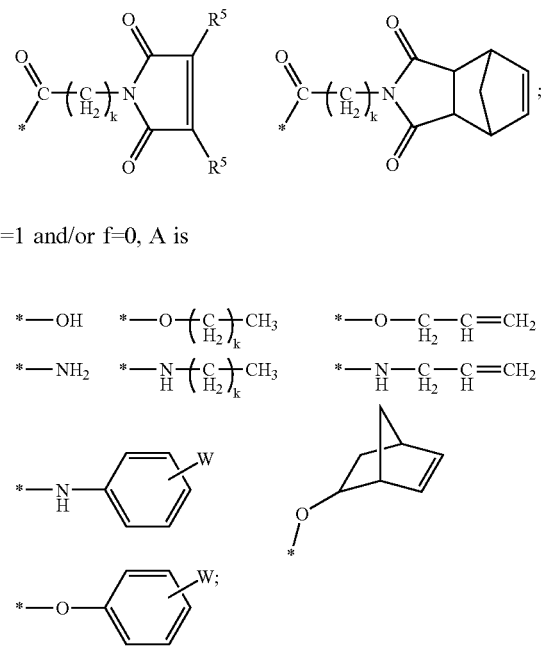
W is
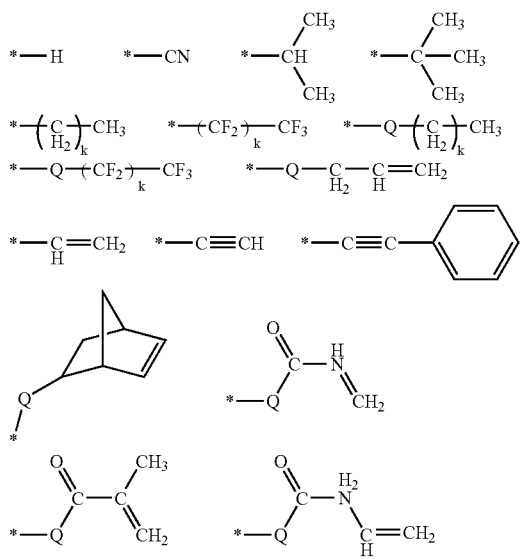

-continued
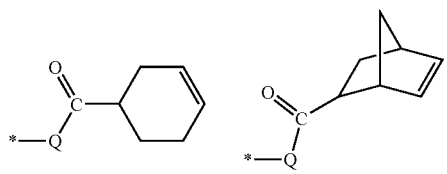
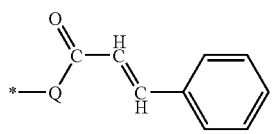
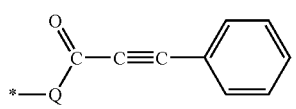
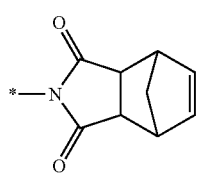
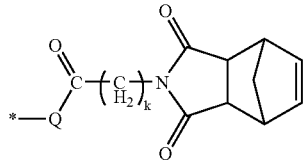
Q is
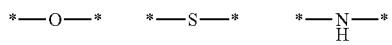
$R^1$ is
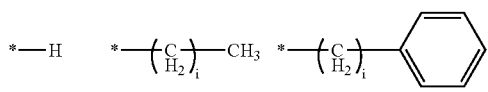
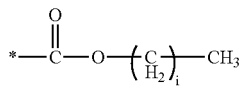
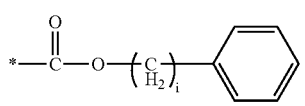
$R^2$ is —H, an alkyl group having 1 to 10 carbon atoms, an aryl group, or a heteroaryl group;
$R^3$ and $R^4$, in each case independently, are a substituted or unsubstituted alkylene, arylene, or cycloalkylene group;
$R^5$ is
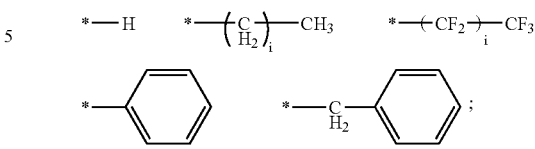
$R^6$ is —H, —$CF_3$, —OH, —SH, —COOH, —N($R^2$)$_2$, an alkyl, aryl, or heteroaryl group, and
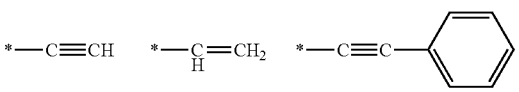
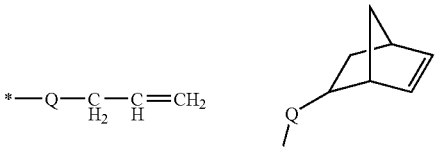
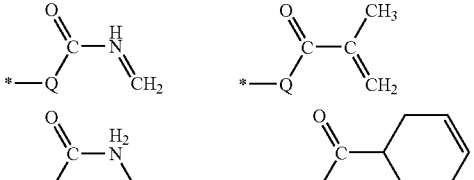
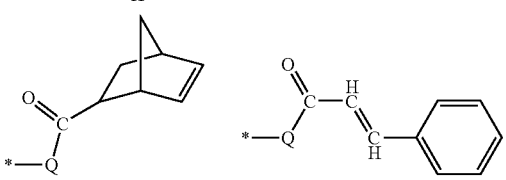
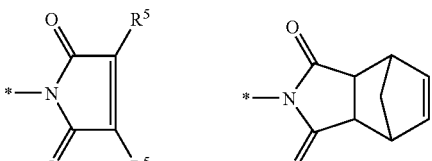
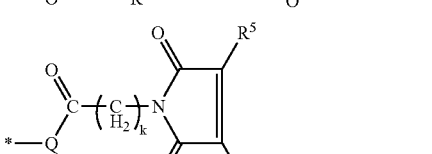
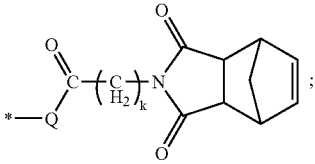
$R^7$ is —O—, —CO—, —$NR^4$—, —S—, —$SO_2$—, —$CH_2$—, —$S_2$—, and

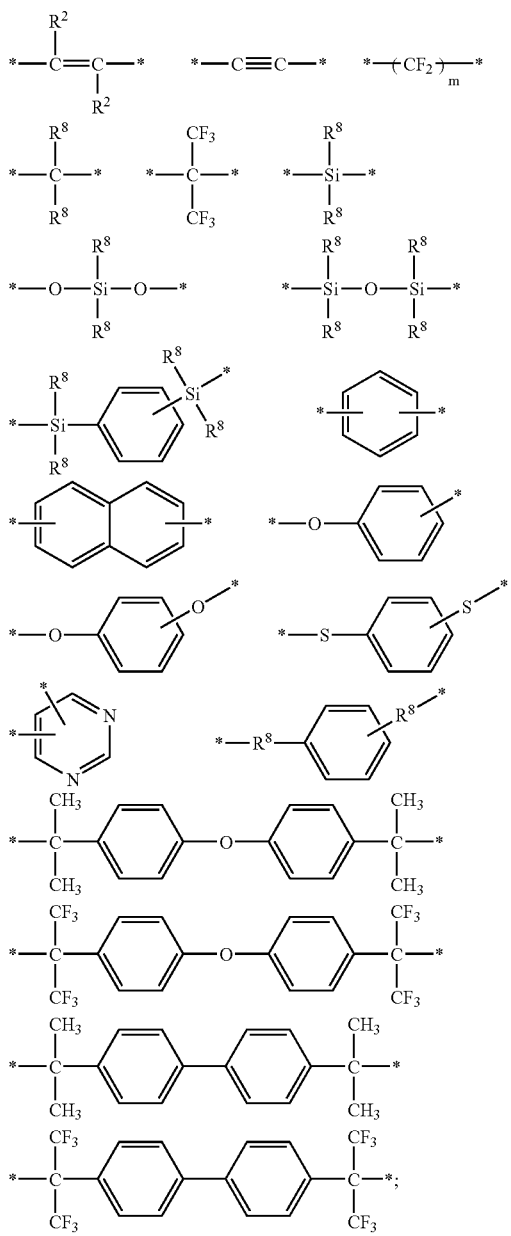

$R^8$ is an alkyl group having 1 to 10 carbon atoms, an aryl group, or a heteroaryl group;
a is 0 or 1;
b is 1-200;
c is 0-200;
d is 0-50;
e is 0-50;
f is 0 or 1;
g is 0-100;
h is 0-100;
i is 0-10;
k is 0-10;
l is 1-10;
m is 1-10;
g and h are not simultaneously 0; and
if $R^7$=—$CH_2$—, l=0-10.

The poly-o-hydroxyamides of the formula I according to the invention can be very readily filled even into narrow trenches having a high aspect ratio and cyclized by heating. The filled trenches have no defects at all, such as bubbles or cracks. The polybenzoxazoles obtained after the cyclization have dielectric constants of less than 2.7 and are therefore very suitable as an electrical insulator. The adhesion of the polybenzoxazole prepared from the poly-o-hydroxyamide of the formula I to surfaces relevant for chip technology, such as silicon, silicon carbide, silicon carbonitride, silicon nitride, silica, titanium, tantalum, titanium nitride, tantalum nitride, or silicon oxynitride, is very good. Furthermore, the polybenzoxazoles have high resistance to chemicals as used in the production of microchips, such as solvents, strippers, bases, acids or aggressive gases. The polymer materials are therefore very suitable for microelectronic applications. In addition, the materials are also outstandingly suitable for the copper damascene technique. During the copper grinding process, no disadvantageous effects occur, such as delamination, cracking or bubble formation. The poly-o-hydroxyamides of the formula I, according to the invention, are very readily soluble in many organic solvents. For example, acetone, cyclohexanone, diethylene glycol mono- and diethyl ether, N-methyl-pyrrolidone, γ-butyrolactone, ethyl lactate, methoxy-propyl acetate, tetrahydrofuran, ethyl acetate, and mixtures of the solvents may be used as solvents. The solutions can be very readily applied to surfaces of electronic components, for example by a spin coating, spraying or dipping method, and have a very good film quality. Even trenches having a width of less than 100 nm and an aspect ratio of >4 can be filled without difficulties. The poly-o-hydroxyamides of the formula I, according to the invention, can be cyclized by heating to temperatures of from 200 to 500° C. In spite of the elimination of water, no formation of defects, such as cracks, in the filled trenches is observed.

The structural units $M^1$, $M^2$, $M^3$, $M^4$, $M^5$, and $M^6$ may be randomly distributed in the polymer. However, it is also possible, by block copolymerization, to produce segments in the polymer that are formed only from a part of the repeating units $M^1$ to $M^6$. According to one embodiment, the polymer may include only the units $M^2$, it being possible for the ends of the polymer chain to be terminated by the groups $M^1$ and $M^5$ or the terminal groups A. The properties of the polymer can be varied by optionally providing the repeating units $M^1$ to $M^5$ in the polymer. The chain length determined by the indices a, b, c, d, e, and f can be controlled by adjusting the stoichiometric ratios of the starting materials and the reaction conditions in the preparation of the poly-o-hydroxyamide of the formula I. In such a polymerization, a distribution of the chain lengths is of course obtained; the reaction is carried out in such a way that the average chain length is within the value ranges stated above for the indices a to f. A narrow molecular weight distribution of the polymers is sought. For the index b, the reaction is controlled in such a way that values in the range from 1 to 200, preferably from 5 to 100, result. For the index c, the reaction is controlled in such a way that values in the range from 0 to 200, preferably from 0 to 50, result. For the index d, the reaction is carried out in such a way that values between 0 and 50, preferably between 0 and 20, result. Finally, for the index e, the reaction is carried out in such a way that values from 0 to 50, preferably from 0 to 20, result. The molecular weights and averaged chain lengths can be determined by customary methods, for example gel permeation chromatography (GPC).

The structure of the terminal groups A is influenced by the terminal groups $M^1$ or $M^6$. For a=0 or f=1, the terminal group A is bonded to an NH group. If a=1 or f=0, A is bonded to a CO group. The terminal groups A can be introduced into the polymer via corresponding activated precursors, e.g. acid chlorides or halides or hydroxides or amines. In individual segments, the poly-o-hydroxyamide of the formula I can be varied within wide limits. Thus, alkyl groups having 1 to 10 carbon atoms can be used for $R^2$. These alkyl groups may be straight-chain or branched, or even present as a ring, for example as a cyclohexyl ring or cyclopentyl ring. If $R^2$ is present as an aryl group, this preferably includes 6 to 12 carbon atoms. It is possible for individual hydrogen atoms of the parent structures also to be replaced by alkyl groups, in particular methyl groups. Heteroaryl groups that may be used for $R^2$ are groups having 4 to 10 carbon atoms; preferably, 1 or 2 nitrogen atoms are present in the ring as heteroatoms. However, other heteroatoms may also be used, such as, for example, oxygen or sulfur. The heteroaryl radical preferably includes at least one 5- or 6-membered ring.

For the substituents $R^3$ and/or $R^4$, substituted or unsubstituted alkylene, arylene, or cycloalkylene groups may be used. The alkylene groups preferably include 1 to 10 carbon atoms and may be linear or branched. Particularly preferably, $R^3$ is a methylene or ethylene group. The arylene groups preferably include 6 to 10 carbon atoms; here too it is possible for individual hydrogen atoms of the aromatic parent structure to be substituted by alkyl groups having 1 to 10 carbon atoms; a methyl group preferably is used here. Groups having 5 to 10 carbon atoms are preferably used as cycloalkylene groups; these groups preferably include 5- and/or 6-membered rings. In the radicals $R^3$ and/or $R^4$, in general, individual hydrogen atoms of the carbon skeleton can be substituted by groups having few heteroatoms, for example halides, hydroxyl groups, or amino groups. For the groups $R^8$, alkyl groups having 1 to 10 carbon atoms can likewise be used; it is possible for these groups to be linear or branched. Aryl groups that may be used are groups having preferably 6 to 12 carbon atoms; it is possible for individual hydrogen atoms of the aromatic carbon skeleton to be substituted by alkyl groups having 1 to 10 carbon atoms. Heteroaryl groups that may be used are groups that have 4 to 12 carbon atoms and contain, for example, 1 or 2 nitrogen atoms as hetero atoms in the aromatic system.

As already mentioned, the polybenzoxazoles obtained from the poly-o-hydroxyamides of the formula I by cyclization have advantageous properties with respect to the heat resistance, the mechanical strength, and the electrical insulation effect.

Therefore, the invention also relates to polybenzoxazoles that are obtained from poly-o-hydroxyamides of the formula I. The mechanism taking place in the cyclization of poly-o-hydroxyamides of the formula I to polybenzoxazoles is shown schematically below:

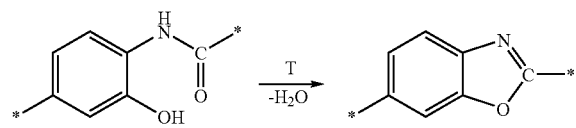

On heating, the o-hydroxyamide undergoes cyclization to give the oxazole with water being liberated. Surprisingly, no bubbles or cracks are formed in the polybenzoxazole during the cyclization of the poly-o-hydroxyamides of the formula I, so that it has extremely high resistance and a very low defect density.

The poly-o-hydroxyamides of the formula I can be prepared by reacting bis-o-aminophenols with dicarboxylic acid or its activated derivatives. Therefore, the invention also relates to a process for the preparation of poly-o-hydroxyamides of the formula I, wherein at least one monomer of the formula II

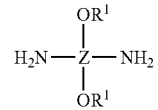

Formula II in which Z is $Z^1$, $Z^2$, or $Z^3$, and $Z^1$, $Z^2$, $Z^3$ and $R^1$ have the abovementioned meaning,
is reacted with at least one dicarboxylic acid or one activated dicarboxylic acid derivative of the formula III

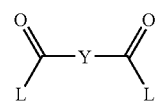

Formula III in which L is a hydroxyl group or an activating group and Y is $Y^1$, $Y^2$, $Y^3$, $Y^4$, or $Y^5$ and $Y^1$, $Y^2$, $Y^3$, $Y^4$, or $Y^5$ have the abovementioned meaning.

For example, acid chlorides or activated esters, for example sulfonic esters, may be used as activating group L for the dicarboxylic acid derivatives of the formula III. The reaction of the monomers of the formula II and of the dicarboxylic acid of the formula III can, however, also be carried out in the presence of a compound that activates the dicarboxylic acid, such as, for example, dicarbonyldiimidazole or dicyclohexyldicarbodiimide. In principle, all reagents that bind the water formed in the reaction to themselves are suitable. For the preparation of the poly-o-hydroxyamides of the formula I, the monomers of the formula II and the dicarboxylic acid(s) or optionally the dicarboxylic acid derivatives of the formula III are reacted in an organic solvent at from −20° C. to 150° C. in the course of from 5 to 20 hours. If required, the terminal groups of the polymer can be blocked with a suitable reagent in order thus to introduce the terminal groups A. Suitable reagents have already been described in the explanation of the compounds of the formula I. In particular, γ-butyrolactone, tetrahydrofuran, N-methylpyrrolidone, and dimethylacetamide are suitable as solvents for the polymer synthesis. However, in principle, any solvent in which the starting components are readily soluble may be used. The poly-o-hydroxyamide of the formula I that is formed after the reaction is precipitated by dropwise addition of the reaction solution to a precipitating agent, washed and dried. Suitable precipitating agents are water and alcohols, such as isopropanol, butanol, or ethanol. Mixtures of these precipitating agents may also be used. The precipitating agent may suitably also contain from 0.1% to 10% of ammonia. After filtration and drying, the precipitated polymer can be directly further processed and, for example, dissolved in a suitable solvent for application to a semiconductor substrate. Suitable solvents are, for example, acetone, cyclohexanone, diethylene glycol mono- or diethyl ether, N-methylpyrrolidone, γ-butyrolactone, ethyl lactate, methoxypropyl acetate, tetrahydrofuran, or ethyl acetate.

The polymerization to give the poly-o-hydroxyamide of the formula I can be carried out in the presence of a base in order to trap acid liberated. Suitable basic acid acceptors are, for example, pyridine, triethylamine, diazabicyclooctane, or polyvinylpyridine. However, other basic acid acceptors also may be used. Compounds that are readily soluble in the solvent used for the synthesis, for example N-methylpyrrolidone, and in the precipitating agent, for example water or water/alcohol mixtures, or those that are completely insoluble in the solvent, such as, for example, crosslinked polyvinylpyridine, are used particularly preferably. The acid acceptors can then readily be separated from the resulting poly-o-hydroxyamide in the working-up of the reaction product.

Furthermore, the invention relates to a process for the preparation of the polybenzoxazoles described above, wherein poly-o-hydroxyamides of the formula I are heated. On heating, an oxazole ring is formed with elimination of a small molecule, generally water, the polybenzoxazoles according to the invention being obtained.

The polybenzoxazole prepared by the process according to the invention has a very low dielectric constant of ≦2.7. It adheres very well to the surfaces relevant for chip technology, such as silicon, silicon carbide, silicon carbonitride, silicon nitride, silica, titanium, tantalum, titanium nitride, tantalum nitride, or silicon oxynitride.

The invention therefore also relates to an electronic component that contains the polybenzoxazole described above. The polybenzoxazole can be disposed, for example, as a dielectric between conductor tracks or conductor track planes or as a buffer layer between microchip and a housing surrounding it.

The dielectrics according to the invention are outstandingly suitable for the copper damascene technique. No disadvantageous effects, such as delamination, cracking, or bubble formation, occur during the grinding process.

Furthermore, the invention relates to a process for the production of an electronic component. Initially, a solution of the poly-o-hydroxyamide of the formula I in a solvent is prepared. The solution is applied to a substrate and the solvent is evaporated so that a film is obtained. The film is then heated in order to cyclize the poly-o-hydroxyamide of the formula I and to convert it into the polybenzoxazole. The film is then structured in order to obtain a resist structure that has trenches and/or contact holes. A conductive material, for example copper, is then deposited on the resist structure so that the trenches and/or contact holes are filled with the conductive material. Finally, excess conductive material is removed.

For example, lithographic methods can be used for structuring the polybenzoxazole film, an etch-resistant material being produced on the film. The structure of the mask is then transferred to the film of the polybenzoxazole according to the invention by etching. The preferably used conductive material is copper. A barrier can be provided between dielectric and conductive material. For example, the materials already mentioned further above are suitable material for the barrier. Excess conductive material is removed, for example, by chemical mechanical planarization.

Furthermore, the invention relates to a process for the production of an electronic component, wherein a solution of a poly-o-hydroxyamide of the formula I in a solvent is first prepared. The solution is then applied to a substrate that already has, on its surface, metallic structures between which trenches and/or contact holes are formed. Such structures are, for example, conductor tracks. The solvent is evaporated so that the trenches and/or contact holes are filled with the poly-o-hydroxyamide of the formula I. Finally, the substrate is heated in order to cyclize the poly-o-hydroxyamide of the formula I to the polybenzoxazole.

The adhesion of the poly-o-hydroxyamides of the formula I or of the polybenzoxazoles obtained from them to surfaces relevant in microelectronics, such as, for example, silicon, silica, silicon nitride, tantalum nitride, glass, or quartz, can be improved by adding adhesion promoters.

Other features that are considered as characteristic for the invention are set forth in the appended claims.

Although the invention is illustrated and described herein as embodied in a poly-o-hydroxyamide, a polybenzoxazole from the poly-o-hydroxyamide, an electronic component including a polybenzoxazole, and processes for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

EXAMPLES

Figure 1:
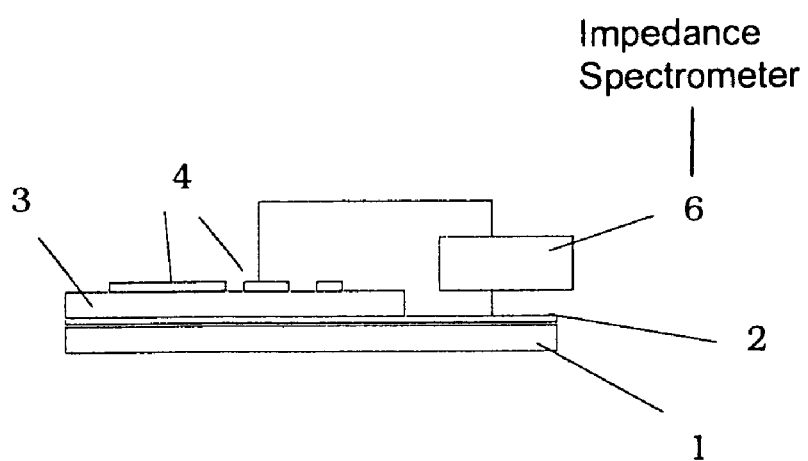
FIG. 1 is a diagrammatic sectional view of a test setup according to the invention for determining the dielectric constant.

Chemicals Used:
Bisaminophenols:

3,3'-Diamino-4,4'-dihydroxytetraphenylmethane—(bisaminophenol 1)

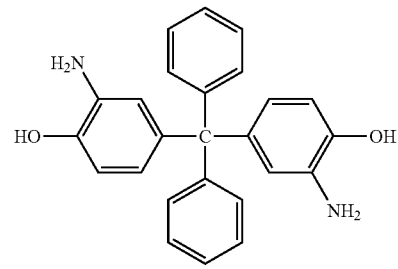

4,4'-Di-(4-amino-3-hydroxyphenoxy)tetraphenyl-
methane—(bisaminophenol 2)

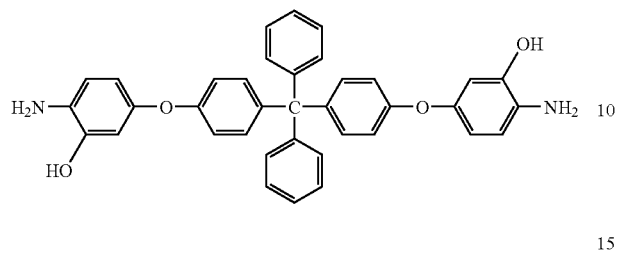

9,10-Bis(3-amino-4-hydroxyphenyl)anthracene—
(bisaminophenol 3)

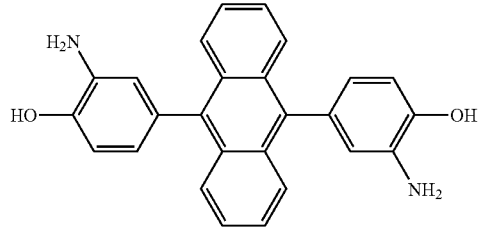

4,4'-Diamino-3,3'-dihydroxybiphenyl—(bisami-
nophenol 4)

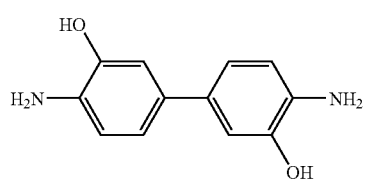

4,4'-Diacetoxy-3,3'-diaminotetraphenylmethane—
(bisaminophenol 5)

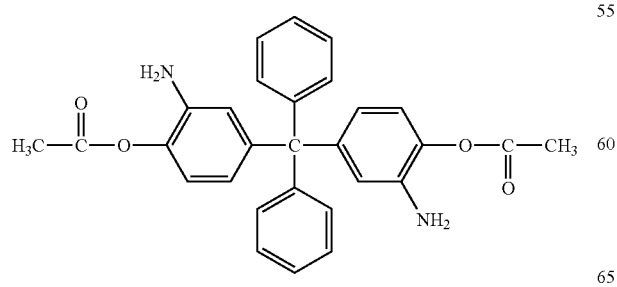

Dicarboxylic Acid Chloride:

Naphthalene-2,6-dicarboxylic acid
chloride—(dicarboxylic acid chloride 1)

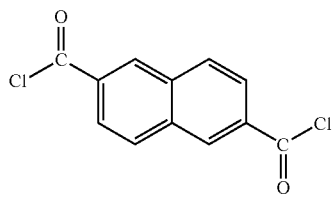

Biphenyl-4,4'-dicarboxylic acid
chloride—(dicarboxylic acid chloride 2)

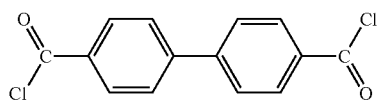

4,4'-Di(chlorocarbonyl)diphenyl
ether—(dicarboxylic acid chloride 3)

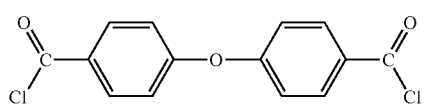

Terephthaloyl dichloride—(dicarboxylic acid
chloride 4)

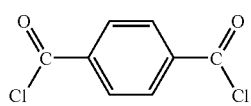

5-Phenylethynylisophthaloyl
chloride—(dicarboxylic acid chloride 5)

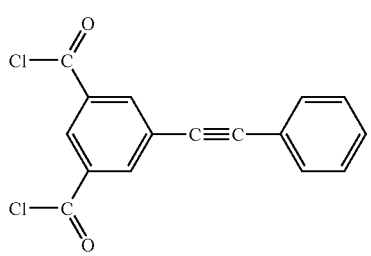

5-Allyloxyisophthaloyl dichloride—(dicarboxylic acid chloride 6)

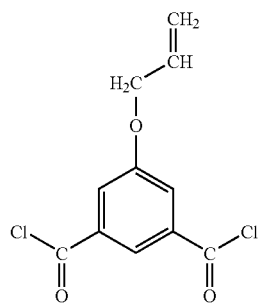

Bisamino Compounds:

Poly(propylene glycol)-bis-(2-aminopropyl ether) (bisamino compound 1)

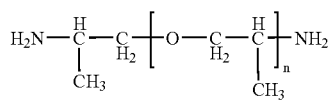

M=4,000 g/mol
Bishydroxy Compounds:

UH-Carb 200 (UBE Industries, LTD.)—(bishydroxy compound 1)

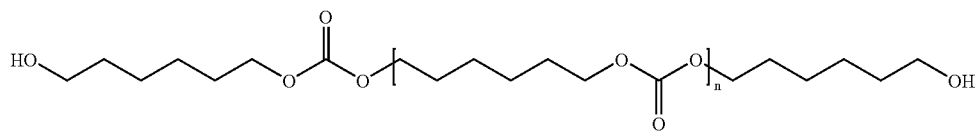

M=2,000 g/mol

Poly[di(ethylene glycol) phthalate] diol—(bishydroxy compound 2)

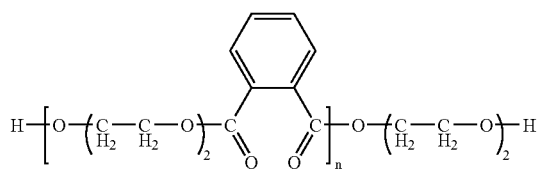

M=814 g/mol
Endcap:

Methacryloyl chloride—(endcap 1)

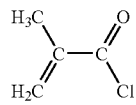

5-Norbornene-2-carboxylic acid chloride—(endcap 2)

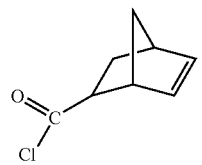

5-Norbornene-2,3-dicarboxylic anhydride—(endcap 3)

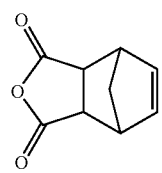

Example 1

Synthesis of Polymer 1

38.21 g (0.1 mol) of bisaminophenol 1 are dissolved in 300 ml of distilled N-methylpyrrolidone (NMP). A solution of 23.93 g (0.095 mol) of dicarboxylic acid chloride 1 in 200 ml of distilled NMP is added dropwise to this solution at 10° C. while stirring. Stirring is effected for a further hour at 10° C. and then for 1 hour at 20° C. After cooling again to 10° C., 1.64 g (0.01 mol) of endcap 3, dissolved in 50 ml of distilled γ-butyrolactone (γ-BL), are added dropwise to the reaction mixture and stirring is effected for 1 hour at 10° C. and then for 1 hour at 20° C. The reaction mixture is cooled to 10° C., after which 19.76 g (0.25 mol) of pyridine, dissolved in 30 ml of distilled γ-BL, are added and the reaction mixture is warmed up to room temperature and stirred for 2 hours.

In order to isolate the polymer, the reaction mixture is filtered and the filtrate is added dropwise to a mixture of 1 l of demineralized water and 200 ml of isopropanol while stirring, a further 3 l of demineralized water being added

Example 2

Synthesis of Polymer 2

36.3 g (0.095 mol) of bisaminophenol 1 are dissolved in 300 ml of distilled NMP. A solution of 27.8 g (0.1 mol) of dicarboxylic acid chloride 2 in 250 ml of distilled γ-BL is added dropwise to this solution at 10° C. while stirring. Stirring is effected for a further hour at 10° C. and then for 1 hour at 20° C. After cooling again to 10° C., 80 g (0.02 mol) of bisaminophenol compound 1, dissolved in 200 ml of distilled γ-BL, are added dropwise to the reaction mixture and stirring is effected for 1 hour at 10° C. and then for 1 hour at 20° C. The reaction mixture is cooled to 10° C., after which 25.28 g (0.25 mol) of triethylamine (TEA), dissolved in 50 ml of distilled γ-BL, are added and the reaction mixture is warmed up to room temperature and stirred for 2 hours.

In order to isolate the polymer, the reaction mixture is filtered and the filtrate is added dropwise to cyclohexane or a mixture of 4 l of cyclohexane and 2 l of demineralized water while stirring and is stirred for 12 h at room temperature. The polymer that separates out at the phase boundary is filtered off with suction and washed with 2 l of cold demineralized water. After the filtration with suction, the polymer is stirred twice for 1 hour at 50° C. into 2.5 l of demineralized water each time and then filtered off with suction. The polymer is washed with demineralized water, filtered off and dried for 72 hours at 50° C./10 mbar.

The polymer prepared in this manner is readily soluble in solvents such as NMP, γ-BL, cyclohexanone, cyclopentanone, diethylene glycol monomethyl ether, ethyl lactate, or mixtures thereof.

Example 3

Synthesis of Polymer 3

28.31 g (0.05 mol) of bisaminophenol 2 are dissolved in 250 ml of distilled NMP. A solution of 8.82 g (0.03 mol) of dicarboxylic acid chloride 3 and 3.53 g (0.0175 mol) of dicarboxylic acid chloride 4 in 150 ml of distilled γ-BL is added dropwise to this solution at 10° C. while stirring. Stirring is effected for a further hour at 10° C. and then for 1 hour at 20° C. After cooling again to 10° C., 0.52 g (0.005 mol) of endcap 1, dissolved in 20 ml of distilled γ-BL, is added dropwise to the reaction mixture and stirring is effected for 1 hour at 10° C. and then for 1 hour at 20° C. The reaction mixture is cooled to 10° C., after which 9.48 g (0.12 mol) of pyridine, dissolved in 30 ml of distilled γ-BL, are added and the reaction mixture is warmed up to room temperature and stirred for 2 hours.

The isolation and working-up of polymer 3 were effected analogously to example 1.

Example 4

Synthesis of Polymer 4

53.79 g (0.095 mol) of bisaminophenol 2 are dissolved in 400 ml of distilled NMP. A solution of 15.1 g (0.05 mol) of dicarboxylic acid chloride 5 and 12.9 g (0.05 mol) of dicarboxylic acid chloride 6 in 200 ml of distilled γ-BL is added dropwise to this solution at 10° C. while stirring. Stirring is effected for a further hour at 10° C. and for then 1 hour at 20° C. After cooling again to 10° C., 40 g (0.02 mol) of bishydroxy compound 1, dissolved in 100 ml of distilled γ-BL, are added dropwise to the reaction mixture and stirring is effected for 1 hour at 10° C. and then for 1 hour at 20° C. The reaction mixture is cooled to 10° C., after which 15.17 g (0.15 mol) of TEA, dissolved in 50 ml of distilled γ-BL, are added and the reaction mixture is warmed up to room temperature and stirred for 2 hours.

The isolation and working-up of polymer 4 were effected analogously to example 2.

Example 5

Synthesis of Polymer 5

19.11 g (0.05 mol) of bisaminophenol 1 are dissolved in 250 ml of distilled NMP. A solution of 5.56 g (0.02 mol) of dicarboxylic acid chloride 2 in 80 ml of distilled γ-BL is added dropwise to this solution at 10° C. while stirring. Stirring is effected for a further hour at 10° C. and then for 1 hour at 20° C. Cooling is effected to 10° C. and 5.55 g (0.0275 mol) of dicarboxylic acid chloride 4, dissolved in 80 ml of distilled γ-BL, is added dropwise. Stirring is effected for a further hour at 10° C. and then for 1 hour at 20° C. After cooling again to 10° C., 0.78 g (0.005 mol) of endcap 2, dissolved in 20 ml of distilled γ-BL, is added dropwise to the reaction mixture and stirring is effected for 1 hour at 10° C. and then for 1 hour at 20° C. The reaction mixture is cooled to 10° C., after which 11.85 g (0.15 mol) of pyridine, dissolved in 50 ml of distilled γ-BL, are added and the reaction mixture is warmed up to room temperature and stirred for 2 hours.

The isolation and working-up of polymer 5 were effected analogously to example 1.

Example 6

Synthesis of Polymer 6

37.25 g (0.095 mol) of bisaminophenol 3 are dissolved in 400 ml of distilled NMP. A solution of 15.12 g (0.06 mol) of dicarboxylic acid chloride 1 in 150 ml of distilled NMP is added dropwise to this solution at 10° C. while stirring. Stirring is effected for a further hour at 10° C. and then for 1 hour at 20° C. Cooling is effected to 10° C. and 10.32 g (0.04 mol) of dicarboxylic acid chloride 6, dissolved in 100 ml of distilled γ-BL, are added dropwise. Stirring is effected for a further hour at 10° C. and then for 1 hour at 20° C. After cooling again to 10° C., 16.28 g (0.02 mol) of bishydroxy compound 2, dissolved in 80 ml of distilled γ-BL, are added dropwise to the reaction mixture and stirring is effected for 1 hour at 10° C. and then for 1 hour at 20° C. The reaction mixture is cooled to 10° C., after which 25.28 g (0.25 mol) of TEA, dissolved in 80 ml of distilled γ-BL, are added and the reaction mixture is warmed up to room temperature and stirred for 2 hours.

The isolation and working-up of polymer 6 were effected analogously to example 2.

Example 7

Synthesis of Polymer 7

28.31 g (0.05 mol) of bisaminophenol 2 and 23.31 g (0.05 mol) of bisaminophenol 5 are dissolved in 500 ml of distilled NMP. A solution of 27.93 g (0.095 mol) of dicarboxylic acid chloride 3 in 150 ml of distilled γ-BL is added dropwise to this solution at 10° C. while stirring. Stirring is effected for a further hour at 10° C. and then for 1 hour at 20° C. After cooling again to 10° C., 1.64 g (0.01 mol) of endcap 1, dissolved in 20 ml of distilled γ-BL, are added dropwise to the reaction mixture and stirring is effected for 1 hour at 10° C. and then for 1 hour at 20° C. The reaction mixture is cooled to 10° C., after which 19.76 g (0.25 mol) of pyridine, dissolved in 50 ml of distilled γ-BL, are added and the reaction mixture is warmed up to room temperature and stirred for 2 hours.

The isolation and working-up of polymer 7 were effected analogously to example 1.

Example 8

Synthesis of Polymer 8

33.97 g (0.06 mol) of bisaminophenol 2 and 15.68 g (0.04 mol) of bisaminophenol 3 are dissolved in 500 ml of distilled NMP. A solution of 14.7 g (0.05 mol) of dicarboxylic acid chloride 3 and 13.59 g (0.045 mol) of dicarboxylic acid chloride 5 in 250 ml of distilled γ-BL is added dropwise to this solution at 10° C. while stirring. Stirring is effected for a further hour at 10° C. and then for 1 hour at 20° C. After cooling again to 10° C., 1.56 g (0.01 mol) of endcap 2, dissolved in 50 ml of distilled γ-BL, are added dropwise to the reaction mixture and stirring is effected for 1 hour at 10° C. and then for 1 hour at 20° C. The reaction mixture is cooled to 10° C., after which 19.76 g (0.25 mol) of pyridine, dissolved in 50 ml of distilled γ-BL, are added and the reaction mixture is warmed up to room temperature and stirred for 2 hours.

The isolation and working-up of polymer 8 were effected analogously to example 1.

Example 9

Synthesis of Polymer 9

24.84 g (0.065 mol) of bisaminophenol 1 and 6.48 g (0.03 mol) of bisaminophenol 4 are dissolved in 400 ml of distilled NMP. A solution of 15.12 g (0.06 mol) of dicarboxylic acid chloride 1 and 12.64 g (0.04 mol) of dicarboxylic acid chloride 2 in 200 ml of distilled γ-BL is added dropwise to this solution at 10° C. while stirring. Stirring is effected for a further hour at 10° C. and then for 1 hour at 20° C. After cooling again to 10° C., 80 g (0.02 mol) of bisamino compound 1, dissolved in 150 ml of distilled γ-BL, are added dropwise to the reaction mixture and stirring is effected for 1 hour at 10° C. and then for 1 hour at 20° C. The reaction mixture is cooled to 10° C., after which 25.28 g (0.25 mol) of TEA, dissolved in 80 ml of distilled γ-BL, are added and the reaction mixture is warmed up to room temperature and stirred for 2 hours.

The isolation and working-up of polymer 9 were effected analogously to example 2.

Example 10

Synthesis of Polymer 10

23.53 g (0.06 mol) of bisaminophenol 3 are dissolved in 250 ml of distilled NMP. A solution of 11.11 g (0.055 mol) of dicarboxylic acid chloride 1 in 80 ml of distilled γ-BL is added dropwise to this solution at 10° C. while stirring. Stirring is effected for a further hour at 10° C. and then for 1 hour at 20° C. Cooling is effected to 10° C. and 8.64 g (0.04 mol) of bisaminophenol 4, dissolved in 80 ml of distilled NMP, are added dropwise. Stirring is effected for a further hour at 10° C. and then for 1 hour at 20° C. Cooling is effected again to 10° C. and 12.08 g (0.04 mol) of dicarboxylic acid chloride 5, dissolved in 80 ml of distilled γ-BL, are added dropwise. Stirring is effected for a further hour at 10° C. and then for 1 hour at 20° C. After cooling again to 10° C., 1.04 g (0.01 mol) of endcap 1, dissolved in 20 ml of distilled γ-BL, are added dropwise to the reaction mixture and stirring is effected for 1 hour at 10° C. and then for 1 hour at 20° C. The reaction mixture is cooled to 10° C., after which 19.76 g (0.25 mol) of pyridine, dissolved in 50 ml of distilled γ-BL, are added and the reaction mixture is warmed up to room temperature and stirred for 2 hours.

The isolation and working-up of polymer 10 were effected analogously to example 1.

Example 11

Determination of the Thermal Stabilities

All polymers described have thermal stabilities of >490° C. according to TGA investigations (apparatus: STA 1500 from Rheometric Scientific, heating rate: 5 K/min, inert gas: argon). The isothermal mass loss per hour (at 425° C.) is <0.6%.

The polymers described thus meet the requirements for the applications stated at the outset.

Example 12

Preparation of Polymer Solutions 25 g of the polymers described in examples 1 to 10 are dissolved in 75 g of distilled NMP (VLSI-Selectipur®) or distilled γ-BL (VLSI-Selectipur®). The dissolution process is expediently effected on a shaking apparatus at room temperature. The solution is then filtered under pressure through a 0.2 µm filter into a cleaned, particle-free sample tube. The viscosity of the polymer solution can be changed by varying the dissolved mass of polymer.

Example 13

Improvement of the Adhesion by Adhesion Promoter Solutions

By using adhesion promoters, the adhesion of the polymers to surfaces relevant in microelectronics, such as, for example, silicon, silica, silicon nitride, tantalum nitride, glass, or quartz, can be improved.

Adhesion promoters which may be used are, for example, the following compounds:

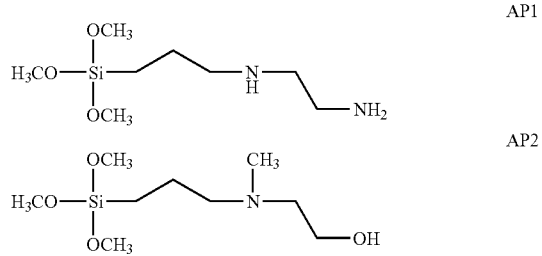

-continued

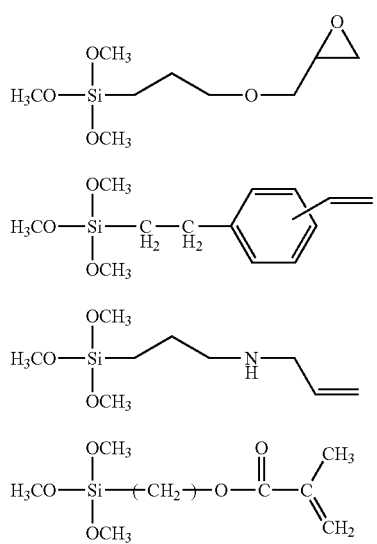

0.5 g of adhesion promoter (e.g. N-(2-aminoethyl)-3-aminopropylmethyldimethoxysilane) is dissolved in 95 g of methanol, ethanol or isopropanol (VLSI-Selectipur®) and 5 g of demineralized water in a cleaned, particle-free sample tube at room temperature. After standing for 24 h at room temperature, the adhesion promoter solution is ready for use. This solution can be used for 3 weeks at the most.

The adhesion promoter should give a monomolecular layer on the surface of the parts to be adhesively bonded. The adhesion promoter can expediently be applied by the spin-coating technique. For this purpose, the adhesion promoter solution is applied via a 0.2 μm prefilter to the surface to be adhesively bonded and is spun for 30 s at 5,000 rpm. This is followed by a drying step for 60 s at 100° C.

Example 14

Application of a Polymer by the Spin-Coating Method and Cyclization to Give the Polybenzoxazole A processed silicon wafer that has lands and trenches up to a minimum dimension of, in each case, about 150 nm is coated with the adhesion promoter, as described in example 13. Thereafter, the filtered solution of the polymer 1 obtained in example 1 is applied to the wafer by using a syringe and is uniformly distributed by using a spin coater. The spin coater speed is 2,000 rpm. The polymer is then heated on a hotplate for 1 min at 120° C. and for 2 min to 200° C. The coated wafer is then heated under nitrogen or argon in an oven for 60 min to 425° C. The polybenzoxazole thus obtained is inert to acids, bases and organic solvents.

Example 15

Determination of the Adhesion of the Polymers on a Titanium Nitride Layer

A 4" silicon wafer is sputtered with a 50 nm thick titanium nitride layer. The solution of polymer 1, obtained in example 12, is applied to this wafer by spin coating, for 5 s at 500 rpm and for 25 s at 2,000 rpm. After a short softbake for 1 min at 120° C. on a hotplate, 10 silicon chips measuring 4×4 mm$^2$, which were likewise sputtered on the surface with 50 nm titanium nitride, are pressed onto the polymer film with a force of 2 N. This stack is then heated for 1 h at 425° C. in a nitrogen atmosphere in an oven. After cooling to room temperature, an adhesion test is carried out by using a shear tester, Dage Series 400.

The mean value of the force for polymer 1, which was required for shearing off the chips, is 17.84 N/mm$^2$.

Example 16

Determination of the Adhesion of the Polymers on a Tantalum Nitride Layer

Example 15 was repeated, but the surface of the wafer and of the chips was formed not of titanium nitride but of tantalum nitride. The mean value of the force for polymer 1, which was required for shearing off the chips, is 16.79 N/mm$^2$.

Example 17

Determination of the Adhesion of the Polymers on Silicon

Example 15 was repeated, but the surface of the wafer and of the chips was formed not of titanium nitride but of silicon. The mean value of the force for polymer 1, which was required for shearing off the Si chips, is 18.27 N/mm$^2$.

Example 18

Determination of the Adhesion of the Polymers on a Silicon Nitride Layer

Example 15 was repeated, but the surface of the wafer and of the chips was formed not of titanium nitride but of silicon nitride. The mean value of the force for polymer 1, which was required for shearing off the chips, is 16.52 N/mm$^2$.

Example 19

Determination of the Adhesion of the Polymers on a Silica Layer

Example 15 was repeated, but the surface of the wafer and of the chips was formed not of titanium nitride but of silica. The mean value of the force for polymer 1, which was required for shearing off the chips, is 17.88 N/mm$^2$.

Example 20

Determination of the Adhesion of the Polymers on a Silicon Carbide Layer

Example 15 was repeated, but the surface of the wafer and of the chips was formed not of titanium nitride but of silicon carbide. The mean value of the force for polymer 1, which was required for shearing off the chips, is 16.75 N/mm$^2$.

Example 21

Determination of the Adhesion of the Polymers on a Tantalum Layer

Example 15 was repeated, but the surface of the wafer and of the chips was formed not of titanium nitride but of tantalum. The mean value of the force for polymer 1, which was required for shearing off the chips, is 16.20 N/mm$^2$.

Example 22

Determination of the Adhesion of the Polymers on a Titanium Layer

Example 15 was repeated, but the surface of the wafer and of the chips was formed not of titanium nitride but of titanium. The mean value of the force for polymer 1, which was required for shearing off the chips, is 17.06 N/mm$^2$.

Example 23

Determination of the Adhesion of the Polymers on a Polyimide Layer

Example 15 was repeated, but the surface of the wafer and of the chips was formed not of titanium nitride but of polyimide. The mean value of the force for polymer 1, which was required for shearing off the chips, is 18.04 N/mm$^2$.

Example 24

Comparative Example for Adhesion

A polymer which was prepared analogously to example 1 of U.S. Pat. No. 5,077,378 is dissolved, as described in example 12, in NMP. Examples 15 to 23 are repeated with this solution, a solution of the polymer from U.S. Pat. No. 5,077,378 being used instead of the solution of polymer 1. The following mean values are determined:

| | |
|---|---|
| Titanium nitride surface: | 14.71 N/mm$^2$ |
| Tantalum nitride surface: | 15.69 N/mm$^2$ |
| Silicon surface: | 15.21 N/mm$^2$ |
| Silicon nitride surface: | 14.03 N/mm$^2$ |
| Silica surface: | 14.94 N/mm$^2$ |
| Silicon carbide surface: | 13.37 N/mm$^2$ |
| Tantalum surface: | 13.96 N/mm$^2$ |
| Titanium surface: | 14.07 N/mm$^2$ |
| Polyimide surface: | 13.02 N/mm$^2$ |

Example 25

Determination of the Chemical Stability to Organic Solvents

Polymer 1 was applied from 20% strength by weight solution (solvent NMP) to three 4" silicon wafers by spin coating, for 5 s at 500 rpm and for 25 s at 2,000 rpm. After a short softbake for 1 min at 120° C. and for 2 min at 200° C. on a hotplate, the wafers were heated for 1 h at 400° C. in a nitrogen atmosphere in an oven. After cooling to room temperature, one coated wafer each was heated for 5 h to 50° C. in NMP, in acetone and in toluene. Thereafter, the wafers are dried for 60 min at 200° C. in vacuo and the mass difference is determined. No delamination phenomena were observed.

Mass Decrease:

| | |
|---|---|
| NMP | 0.9% |
| Acetone | 0.5% |
| Toluene | 0.7% |

Example 26

Determination of the Chemical Stability to Acids

Polymer 2 was applied from 20% strength by weight solution (solvent NMP) to three 4" silicon wafers by spin coating, for 5 s at 500 rpm and for 25 s at 2,000 rpm. After a short softbake for 1 min at 120° C. and for 2 min at 200° C. on a hotplate, the wafers were heated for 1 h at 400° C. in a nitrogen atmosphere in an oven. After cooling to room temperature, one coated wafer each was heated for 5 h to 40° C. in concentrated HCl, in 50% strength sulfuric acid and in acetic acid. Thereafter, the wafers were dried for 60 min at 200° C. in vacuo and the mass difference was determined. No delamination phenomena were observed.

Mass Decrease:

| | |
|---|---|
| Conc. HCl | 0.5% |
| 50% strength H$_2$SO$_4$ | 0.6% |
| Acetic acid | 0.2% |

Example 27

Determination of the Chemical Stability to Bases

Polymer 3 was applied from 20% strength by weight solution (solvent NMP) to three 4" silicon wafers by spin coating, for 5 s at 500 rpm and for 25 s at 2,000 rpm. After a short softbake for 1 min at 120° C. and for 2 min at 200° C. on a hotplate, the wafers were heated for 1 h at 400° C. in a nitrogen atmosphere in an oven. After cooling to room temperature, one coated wafer each was heated for 5 h to 40° C. in 50% strength NaOH, in 47% strength KOH and in concentrated ammonia. Thereafter, the wafers were dried for 60 min at 200° C. in vacuo and the mass difference was determined. No delamination phenomena were observed.

Mass Decrease:

| | |
|---|---|
| 50% strength NaOH | 0.9% |
| 47% strength KOH | 0.7% |
| Conc. Ammonia | 0.1% |

Example 28

Determination of the Dielectric Constant of Polymer 1

Figure 2:
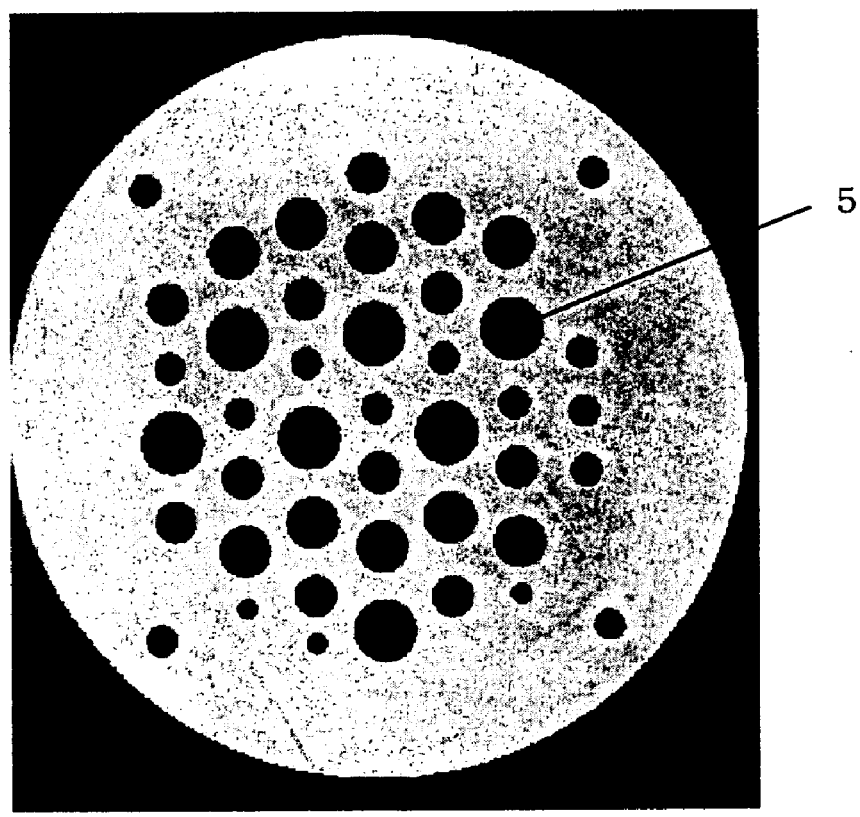
FIG. 2 is a photographic plan view showing a shadow mask as used in examples 28 to 33 for the production of electrodes.

The test setup used for determining the dielectric constant is shown in FIG. 1. Polymer 1 was dissolved in NMP (25% strength solution) and the solution was filtered under pressure over a membrane having 0.2 μm pores. This solution is applied by spin coating to a substrate 1 on which a 600 nm thick Ti layer 2 is already present. The layer 3 is dried at 120° C. and 200° C., for 2 min in each case, on a hotplate and then heated at 430° C. for one hour in a nitrogen atmosphere. Titanium electrodes 4 are then applied by sputtering on this layer 3 via a shadow mask shown in FIG. 2. For this purpose, the shadow mask shown in FIG. 2 includes apertures 5 that correspond in their dimensions and in their configuration to the titanium electrodes 4. The dielectric constant is determined using the impedance spectrometer 6, and is determined as 2.47 in a frequency range from 100 Hz to 1 MHz.

Example 29

Determination of the Dielectric Constant of Polymer 2

The determination of the dielectric constant of polymer 2 was effected analogously to example 28 and gave a value of 2.58.

Example 30

Determination of the Dielectric Constant of Polymer 3

The determination of the dielectric constant of polymer 3 was effected analogously to example 28 and gave a value of 2.63.

Example 31

Determination of the Dielectric Constant of Polymer 4

The determination of the dielectric constant of polymer 4 was effected analogously to example 28 and gave a value of 2.51.

Example 32

Determination of the Dielectric Constant of Polymer 10

The determination of the dielectric constant of polymer 10 was effected analogously to example 28 and gave a value of 2.49.

Example 33

Comparative Example for Dielectric Constant

A test carried out according to example 28 with a polymer prepared analogously to example 1 of U.S. Pat. No. 5,077,378 gave a dielectric constant of 3.1 in the frequency range from 100 Hz to 1 MHz.

Example 34

Determination of the Water Absorption

Polymer 1 was applied from 20% strength solution (solvent NMP) by spin coating to a 4" silicon wafer of known mass, for 5 s at 500 rpm and for 25 s at 3,500 rpm. After a short softbake for 1 min at 120° C. on a hotplate, the wafer is heated for 1 h at 400° C. in a nitrogen atmosphere in an oven. The mass of polymer 1 is determined by using an AT261 Delta Range analytical balance. The coated wafer is then stored for 10 h at 80° C. in water. After the water had been blown off, a further weight determination was effected. The percentage water absorption, based on the mass of polybenzoxazole, was calculated from the mass difference.

Water absorption determined: 0.8%

Example 35

Damascene Structure

Polymer 1 was dissolved in NMP (20% strength by weight solution) and the solution was filtered under pressure through a membrane having 0.2 µm pores. The solution is applied by spin coating to a silicon substrate at 2,500 rpm for 25 s and the layer is dried for 2 min at 100° C. and then for 2 min at 140° C. on a hotplate. The subsequent cure process for 1 h at 400° C. under nitrogen converts the material into the corresponding polybenzoxazole. A 150 nm thick $SiO_2$ layer is deposited as a hard mask on this approximately 700 nm thick PBO layer in a PECVD unit (Novellus Concept 1). This hard mask is structured by using standard lithography and etching techniques. The PBO layer is then structured via the structured hard mask in oxygen plasma in an RIE unit (Lam XL). After deposition of a 10 nm TiN barrier in an AMAT Endura 5500 and application of a thin adhesion promoting and starting layer (50 nm Ti and 100 nm Cu), the structures are filled with copper by electrodeposition (Novellus SABRE System). The projecting copper is then ground back in a CMP process.

Figure 3:
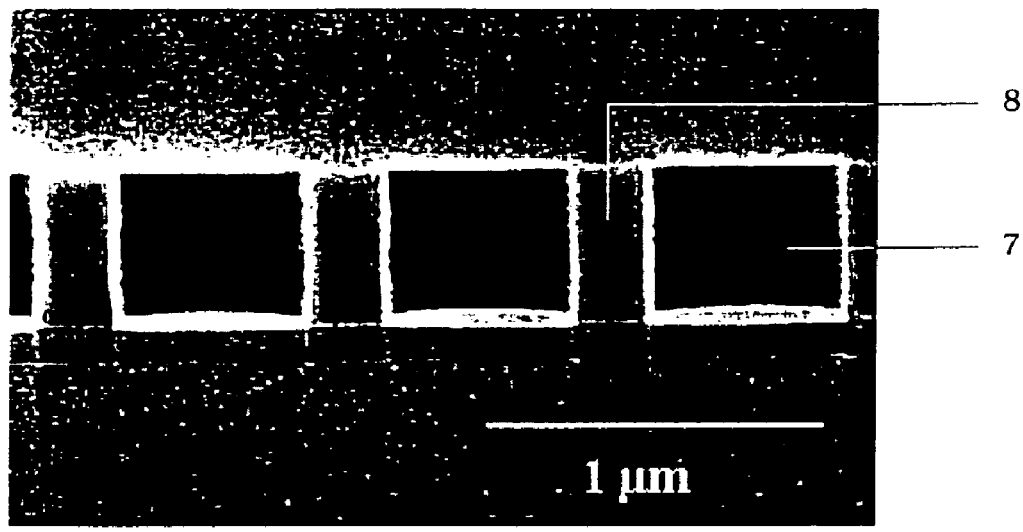
FIG. 3 is a scanning electron micrograph showing a polished fracture through copper conductor tracks that are formed in a polybenzoxazole according to the invention and were produced in a damascene process.

A fracture was produced from the substrate thus prepared, polished, and investigated by using a scanning electron microscope (SEM). The scanning electron micrograph is shown in FIG. 3. The copper lines 7 are embedded in the polybenzoxazole 8, the structures of the polybenzoxazole 8 being homogeneous, bubble-free and crack-free and exhibiting no adhesion problems at all. The copper lines 7 have a width of 0.5 µm, while the space between the copper lines 7, which is filled with the polybenzoxazole 8, has a width of 0.3 µm.

Example 36

Damascene Structure 2

Example 35 was repeated, but polymer 3 was used instead of polymer 1. Here too, bubble-free and crack-free structures exhibiting strong adhesion are obtained.

Example 37

Damascene Structure 3

Example 35 was repeated, but polymer 4 was used instead of polymer 1. Here too, bubble-free and crack-free structures exhibiting strong adhesion are obtained.

Example 38

Damascene Structure 4

Example 35 was repeated, but polymer 7 was used instead of polymer 1. Here too, the same result is obtained, bubble-free and crack-free structures exhibiting strong adhesion.

Example 39

Damascene Structure 5

Example 35 was repeated, but the material from EP 0264678 B1, example 1, was used instead of polymer 1. Here, the structures exhibit cracks and adhesion problems after such a process sequence.

Example 40

Dual Damascene Structure 1

Figure 4:
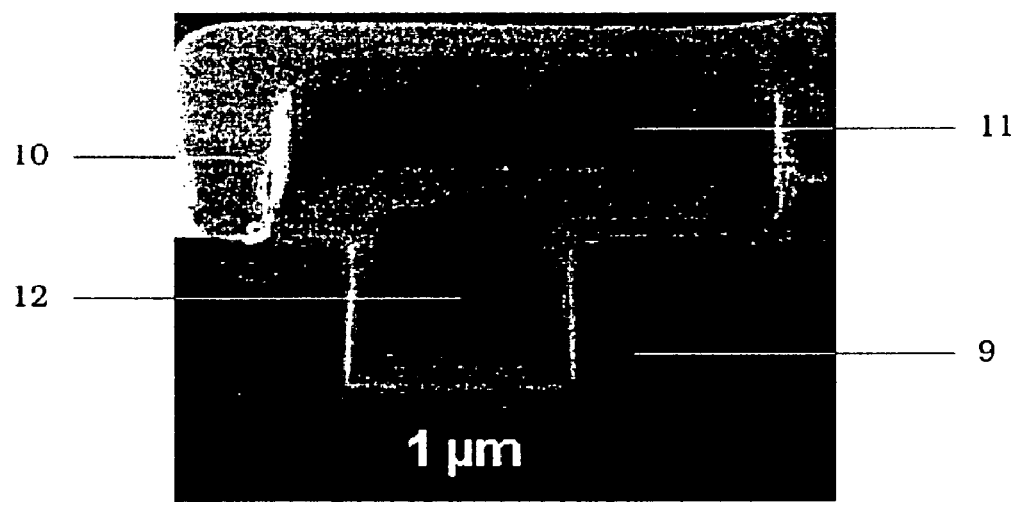
FIG. 4 is a scanning electron micrograph showing a fracture through a dual damascene structure produced from the polybenzoxazole according to the invention.

Polymer 1 was dissolved in NMP (20% strength by weight solution) and the solution was filtered under pressure through a membrane having 0.2 µm pores. The solution is applied by spin coating to a silicon substrate at 2,500 rpm for 25 s, and the layer 2 is dried for 2 min at 100° C. and then for 2 min at 140° C. on a hotplate. The subsequent cure process for 1 h at 400° C. under nitrogen converts the material into the corresponding polybenzoxazole. A 150 nm silica layer is then applied to this approximately 700 nm thick PBO layer with a PECVD unit (Novellus Concept 1) as a so-called hard mask. The hard mask is structured by a standard lithography process and a plasma etching process and the photoresist is removed. A second layer of polymer 1 is applied to the structured hard mask. The 20% strength solution of polymer 1 is applied by spin coating at 3,000 rpm, dried for 2 min each at 100° C. and 140° C. and heated for 1 h at 400° C. A 150 nm thick silica layer is likewise deposited on the second PBO layer, as a hard mask. This layer is structured by standard lithography with a subsequent plasma etching process. The two PBO layers are then structured in an oxygen plasma via the SiO$_2$ masks in an RIE unit (Lam XL). The structure shown was investigated by SEM. The micrograph is shown in FIG. 4. Disposed on a lower layer 9 of polybenzoxazole is an upper layer 10 that is likewise composed of polybenzoxazole. Depressions have been etched into each of the two layers 9, 10, the vertical sidewalls 11, 12 of the depressions having no irregularities and possessing a smooth surface.

Example 41

Dual Damascene Structure 2
Example 40 was repeated, but polymer 3 0was used instead of polymer 1. Here too, defect-free dual damascene structures having vertical and smooth sidewalls are obtained.

Example 42

Dual Damascene Structure 3
Example 40 was repeated, but polymer 8 was used instead of polymer 1. Here too, defect-free dual damascene structures having vertical and smooth sidewalls are obtained.

Example 43

Dual Damascene Structure 4
Example 40 was repeated, but polymer 10 was used instead of polymer 1. Here too, defect-free dual damascene structures having vertical and smooth sidewalls are obtained.

Example 44

Figure 5:
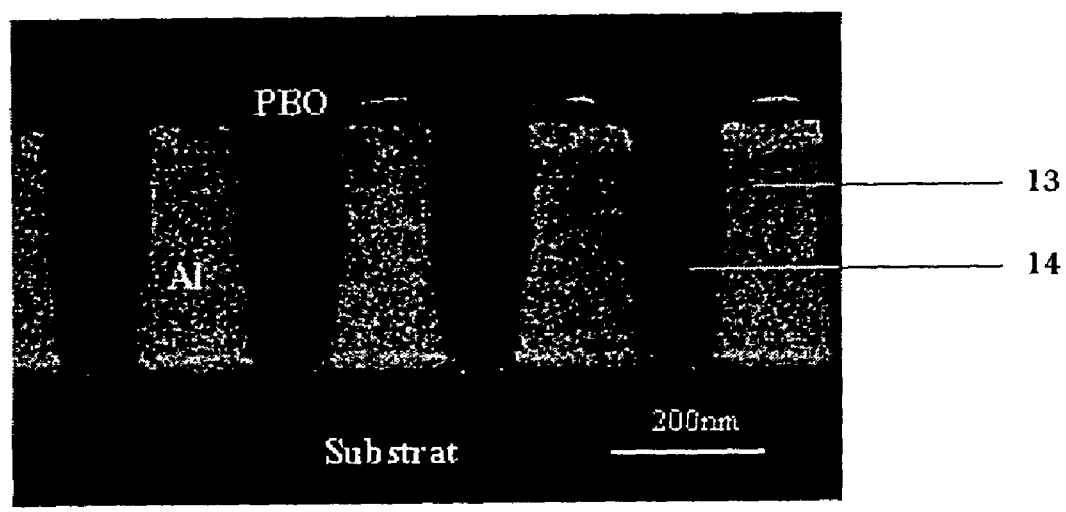
FIG. 5 is a scanning electron micrograph showing a polished fracture through aluminum conductor tracks, the spaces between the Al structures having been filled with the polybenzoxazole according to the invention.

Filling of Narrow Trenches
Polymer 1 was dissolved in NMP (20% strength by weight solution) and the solution was filtered under pressure through a membrane having 0.2 μm pores. This solution was applied by spin coating to a substrate on which metallic structures were already present. After the solution has been applied by spin coating, the layer is dried for 2 min each at 100° C., 140° C., and 200° C. on a hotplate and then heated for 1 h at 400° C. under nitrogen. The metal structures, some of which have an aspect ratio of more than 4, the distance between the structures being only 120 nm in some cases, are electrically insulated from one another in this process. A fracture was produced from the substrate prepared, polished, and investigated using a scanning electron microscope. The micrograph is shown in FIG. 5. Intermediate spaces which are filled with polybenzoxazole 14 are disposed between lines 13 of aluminum. The polybenzoxazole shows no defects.

Example 45

Filling of Narrow Trenches 2
Example 44 was repeated, but polymer 7 was used instead of polymer 1. Here too, the trenches are filled without defects.

Example 46

Filling of Narrow Trenches 3
Example 44 was repeated, but polymer 9 was used instead of polymer 1. Here too, the trenches are filled without defects.

We claim:
1. A poly-o-hydroxyamide having a formula I

Formula I
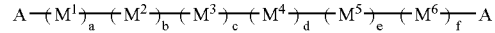

wherein
M$^1$ is

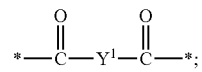

M$^2$ is

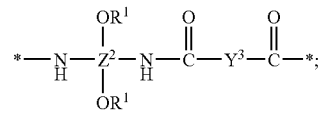

M$^3$, M$^4$, and M$^5$, in each case independently, are monomers selected from the group consisting of

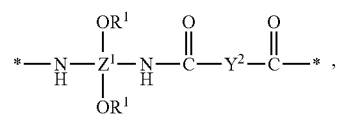

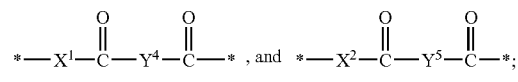

M$^6$ is

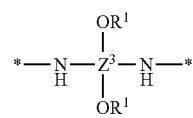

$Z^2$ is a substituent selected from the group consisting of
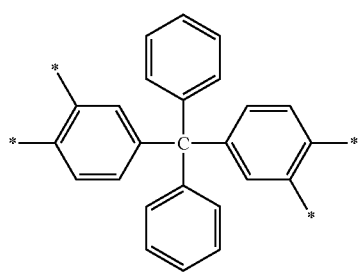
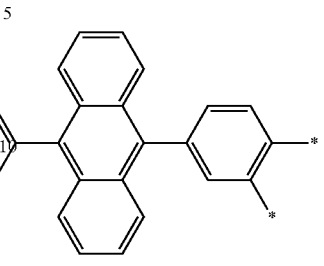
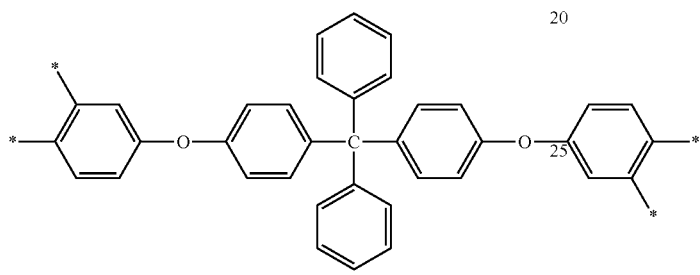
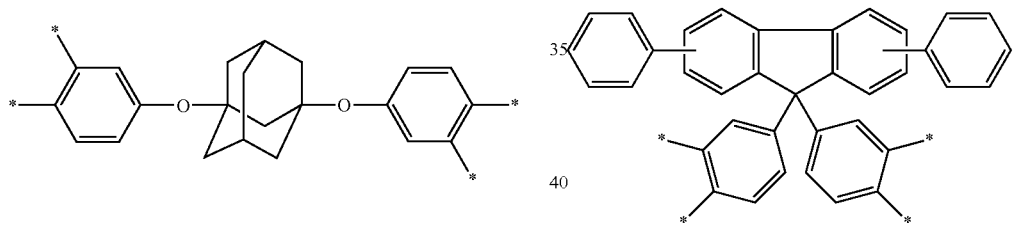
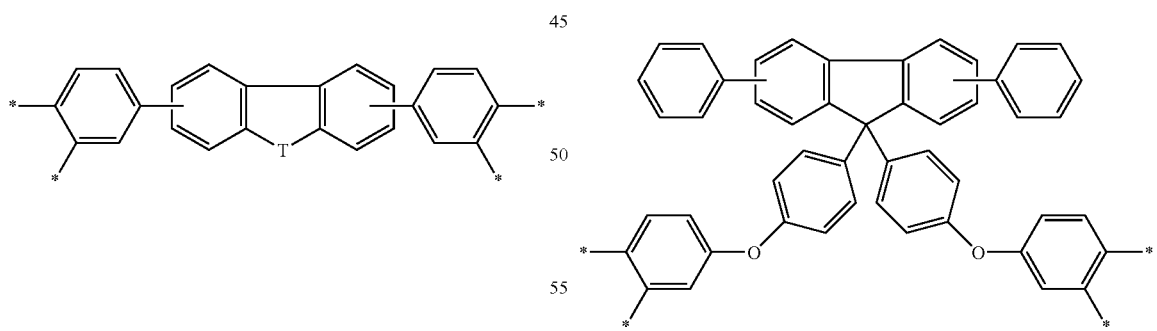
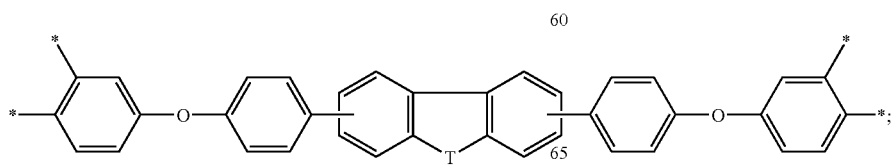

$Z^1$ and $Z^3$, in each case independently, are substituents selected from the group stated for $Z^2$, the group further consisting of
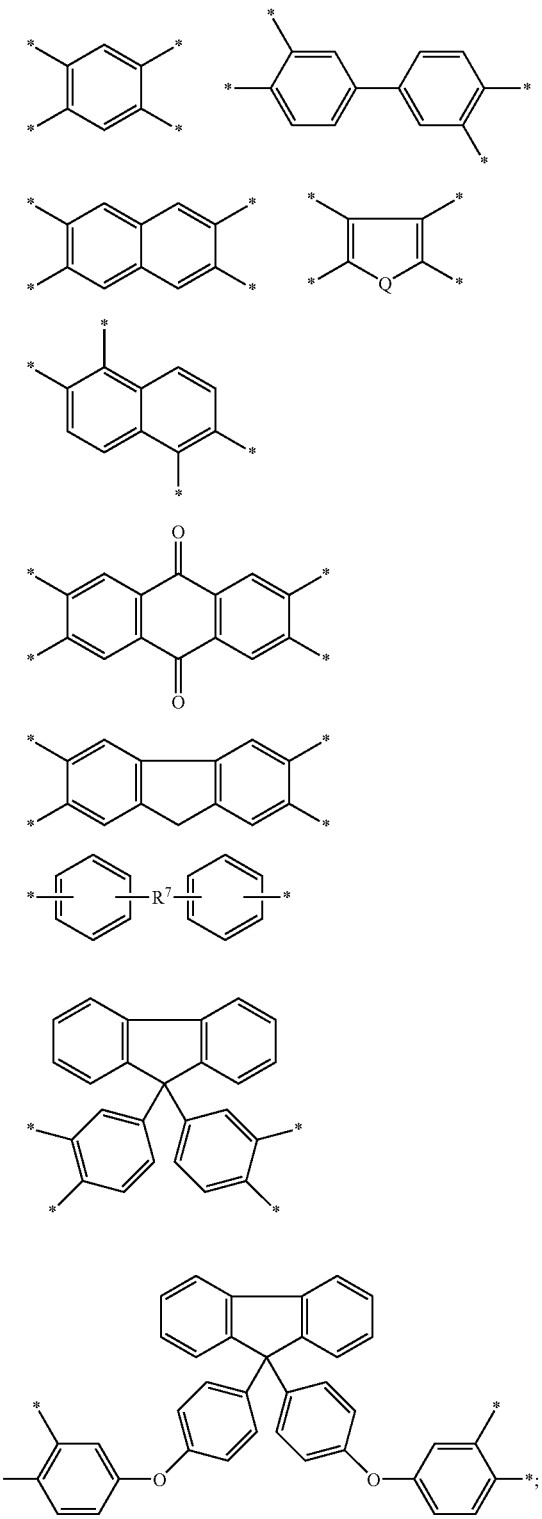
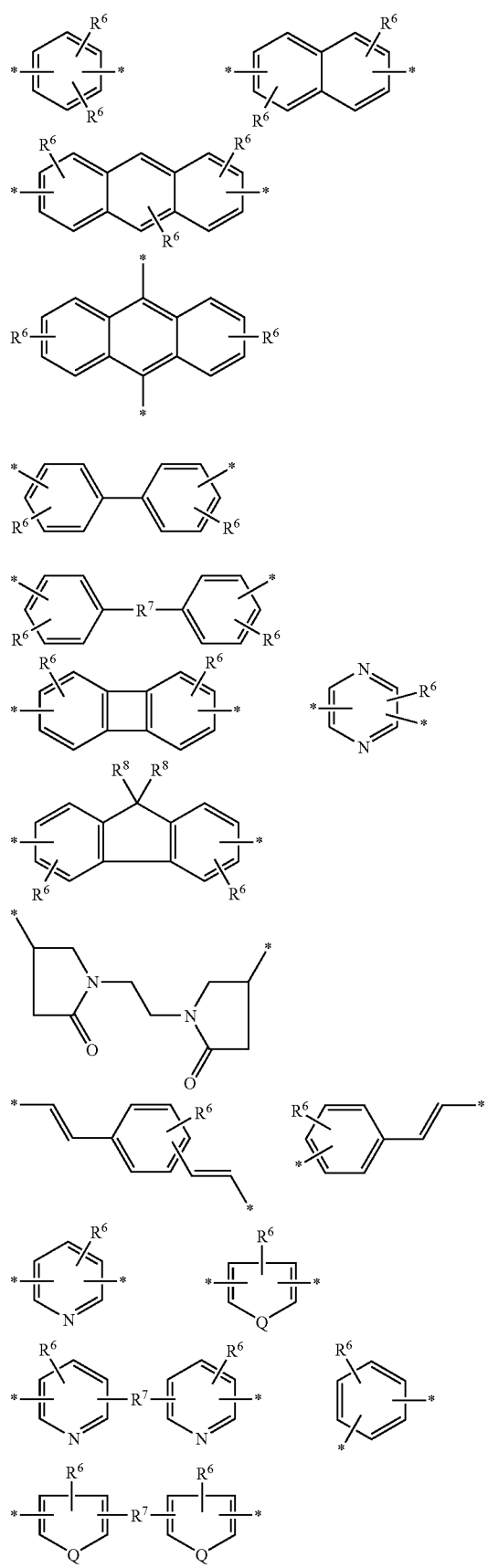
$Y^1$, $Y^2$, $Y^3$, $Y^4$, and $Y^5$ are substituents selected from the group consisting of -continued

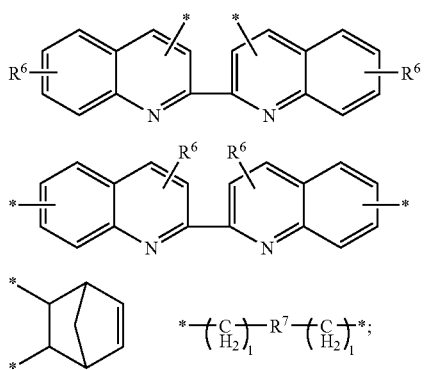

$X^1$ and $X^2$, in each case independently, are selected from the group consisting of:

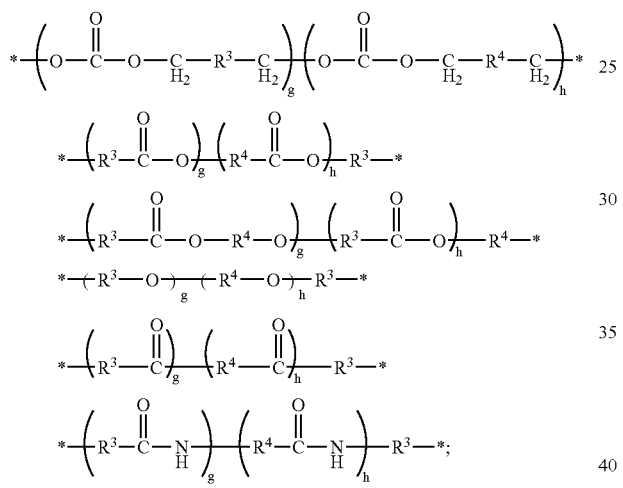

T is a substituent selected from the group consisting of

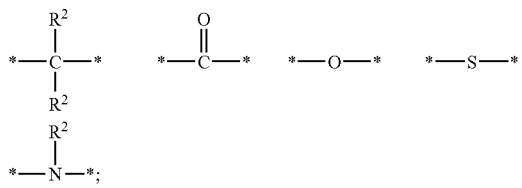

A, if at least one of a=0 and f=1, is a substituent selected from the group consisting of

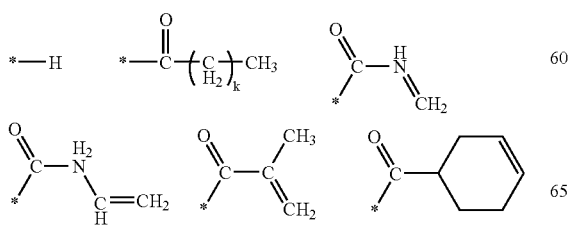

-continued

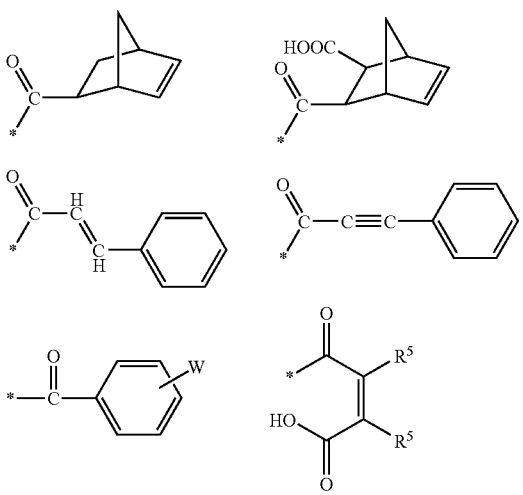

A, if at least one of a=1 and f=0, is a substituent selected from the group consisting of

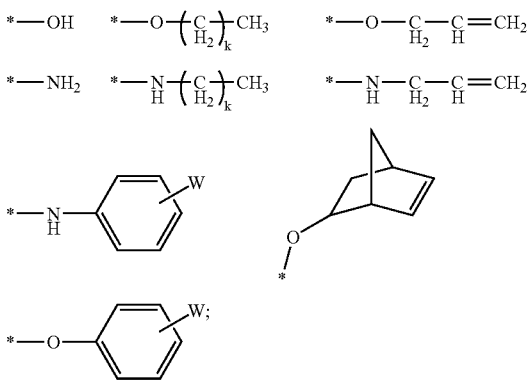

W is a substituent selected from the group consisting of

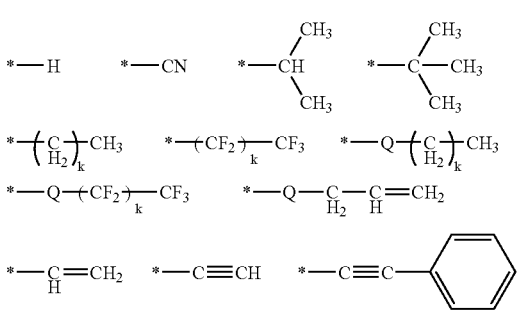

-continued

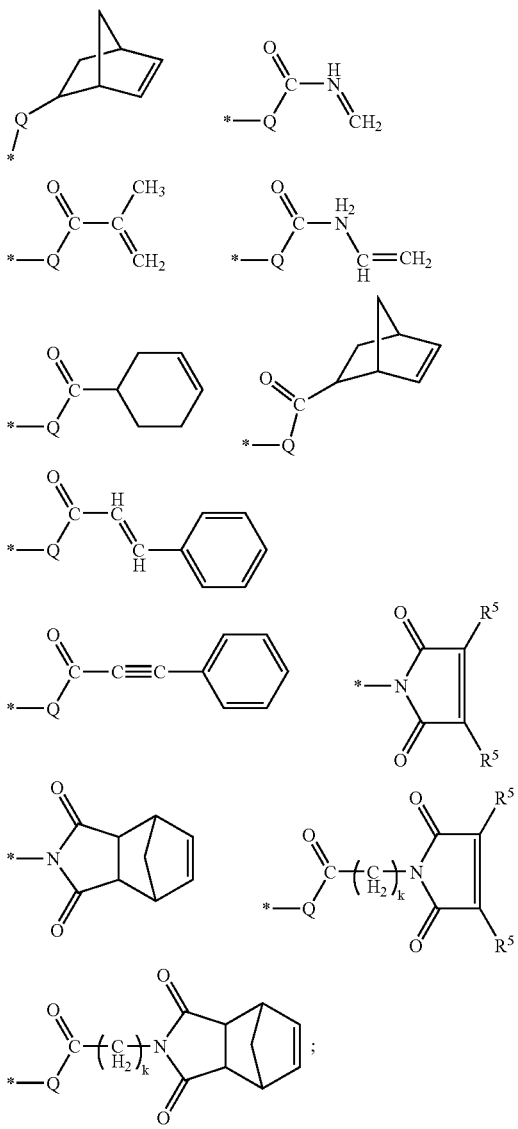

Q is a substituent selected from the group consisting of

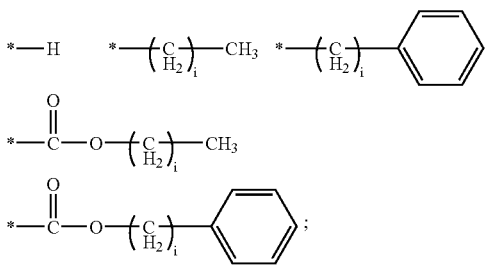

$R^1$ is a substituent selected from the group consisting of

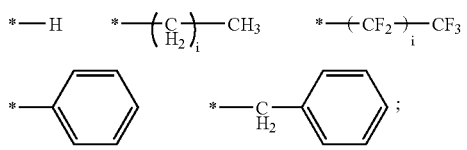

$R^2$ is a substituent selected from the group consisting of
—H, an alkyl group having from 1 to 10 carbon atoms, an aryl group, and a heteroaryl group;

$R^3$ and $R^4$, in each case independently, are substituents selected from the group consisting of a substituted alkylene, an unsubstituted alkylene, arylene, and cycloalkylene group;

$R^5$ is a substituent selected from the group consisting of

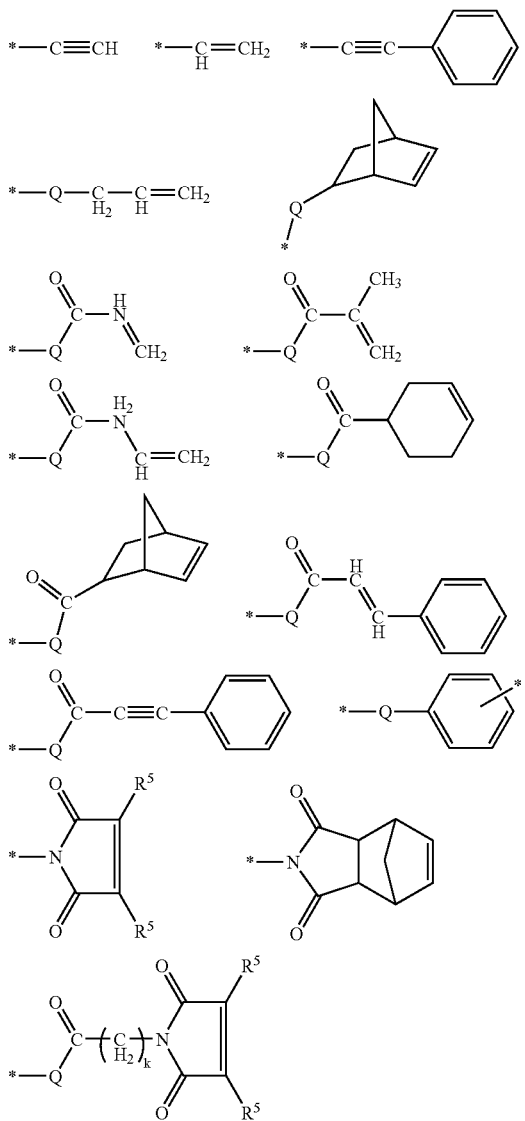

$R^6$ is a substituent selected from the group consisting of —H, —$CF_3$, —OH, —SH, —COOH, —$N(R^2)_2$, an alkyl group, aryl group, a heteroaryl group, and -continued

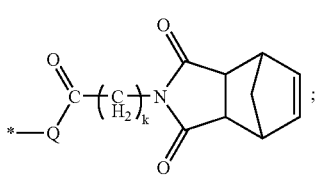

$R^7$ is a substituent selected from the group consisting of —O—, —CO—, —NR$^4$—, —S—, —SO$_2$—, —CH$_2$—, —S$_2$—, and

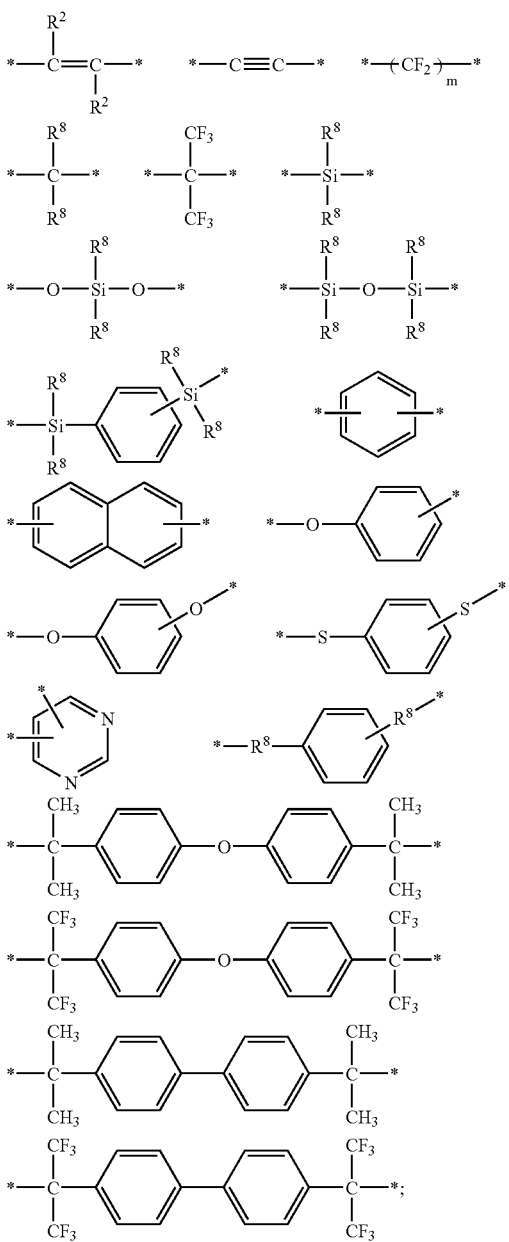

$R^8$ is a subsituent selected from the group consisting of an alkyl group having from 1 to 10 carbon atoms, an aryl group, and a heteroaryl group;

a is an integer from 0 to 1;
b is an integer from 1 to 200;
c is an integer from 0 to 200;
d is an integer from 0 to 50;
e is an integer from 0 to 50;
f is an integer from 0 to 1;
g is an integer from 0 to 100;
h is an integer from 0 to 100;
i is an integer from 0 to 10;
k is an integer from 0 to 10;
l is an integer from 1 to 10;
m is an integer from 1 to 10;
g and h are not simultaneously 0; and
l is an integer from 0 to 10 when $R^7$ is —CH$_2$—.

2. The poly-o-hydroxyamide according to claim 1, wherein b is an integer from 5 to 100.

3. The poly-o-hydroxyamide according to claim 1, wherein c is an integer from 0 to 50.

4. The poly-o-hydroxyamide according to claim 1, wherein d is an integer from 0 to 20.

5. The poly-o-hydroxyamide according to claim 1, wherein e is an integer from 0 to 20.

6. The poly-o-hydroxyamide according to claim 1, wherein at least one of c, d, and e is not equal to zero.

7. A polybenzoxale obtained from a poly-o-hydroxyamide having a formula I

Formula I

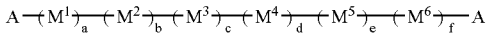

wherein
M$^1$ is

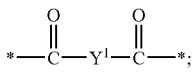

M$^2$ is

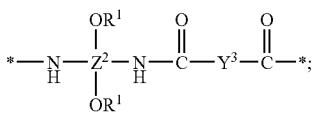

M$^3$, M$^4$, and M$^5$, in each case independently, are monomers selected from the group consisting of

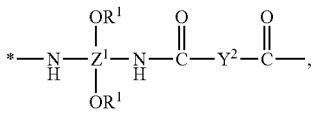

$M^6$ is
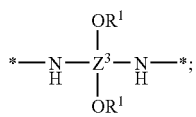
$Z^2$ is a substituent selected from the group consisting of
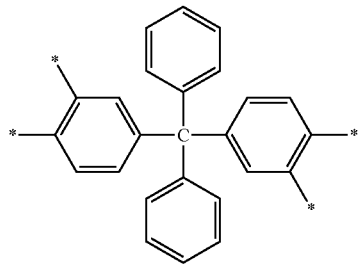 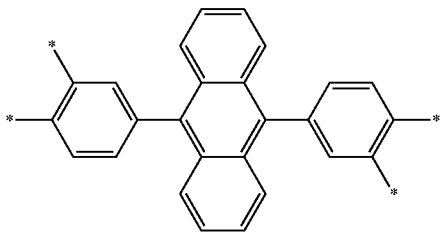
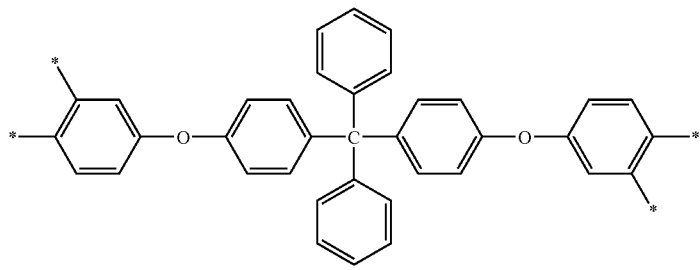
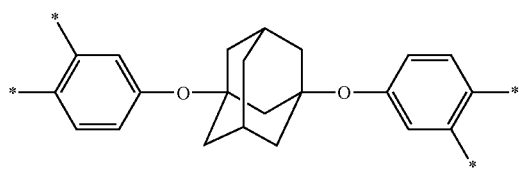 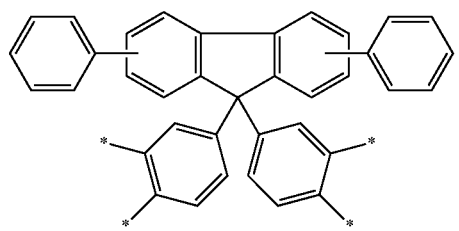
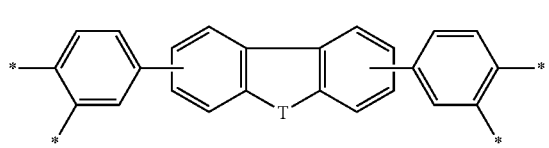 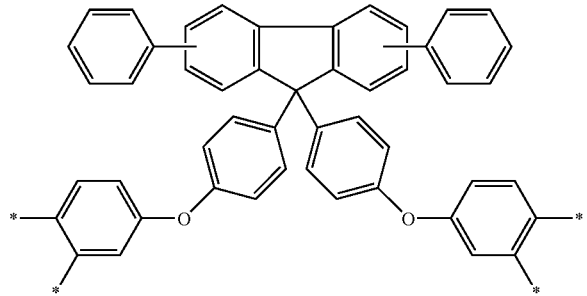
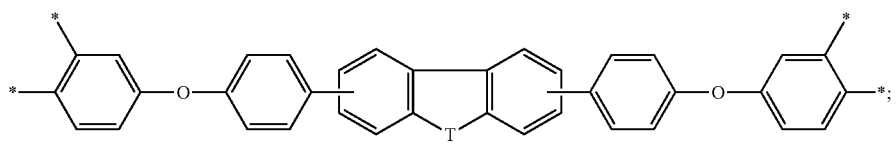

$Z^1$ and $Z^3$, in each case independently, are substituents selected from the group stated for $Z^2$, the group further consisting of
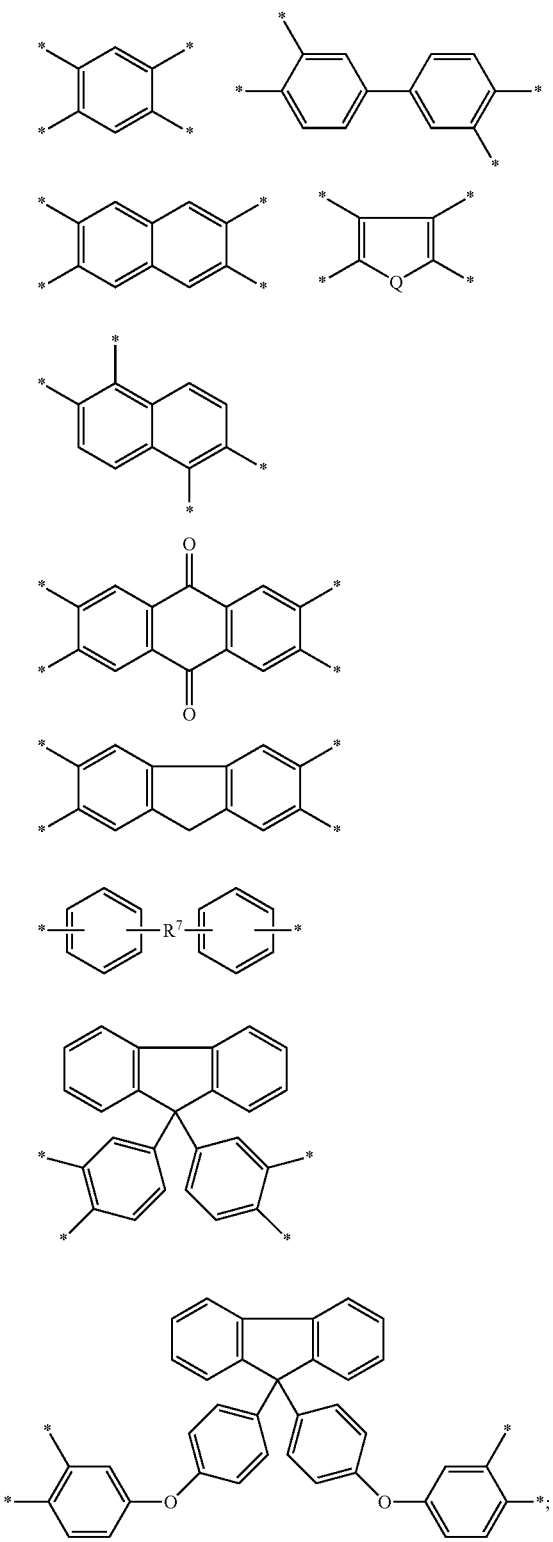
$Y^1$, $Y^2$, $Y^3$, $Y^4$, and $Y^5$ are substituents selected from the group consisting of
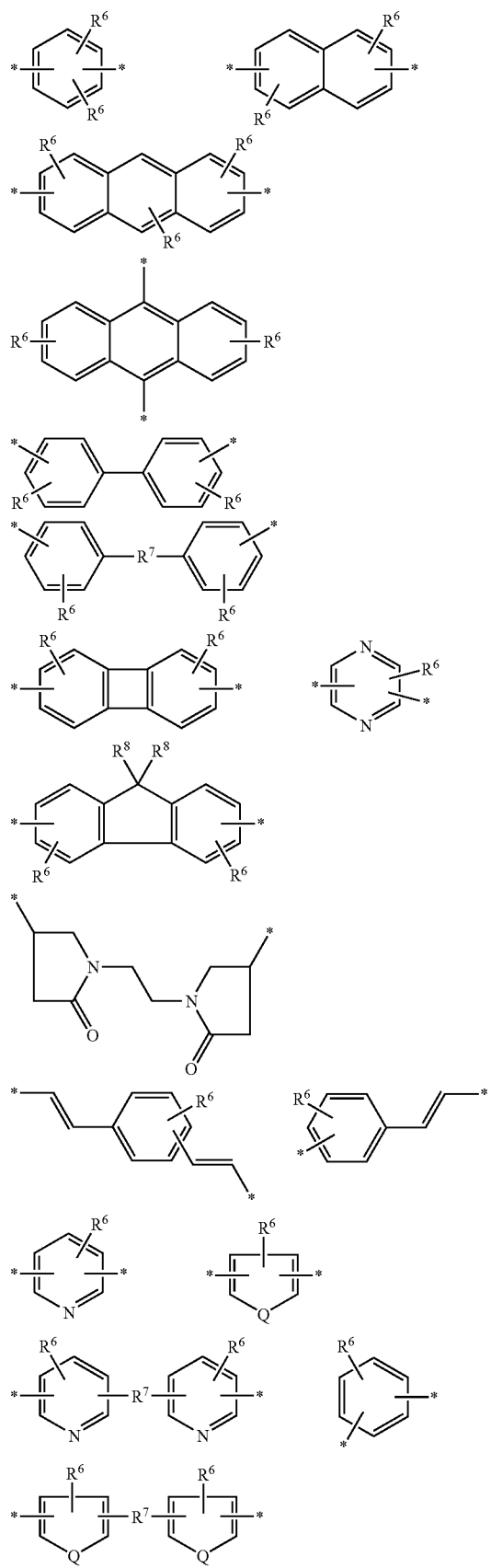

-continued

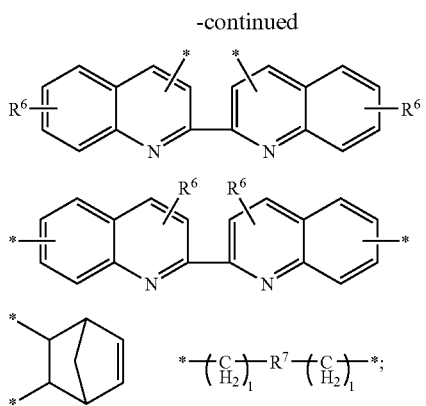

$X^1$ and $X^2$, in each case independently, are substituents selected from the group consisting of:

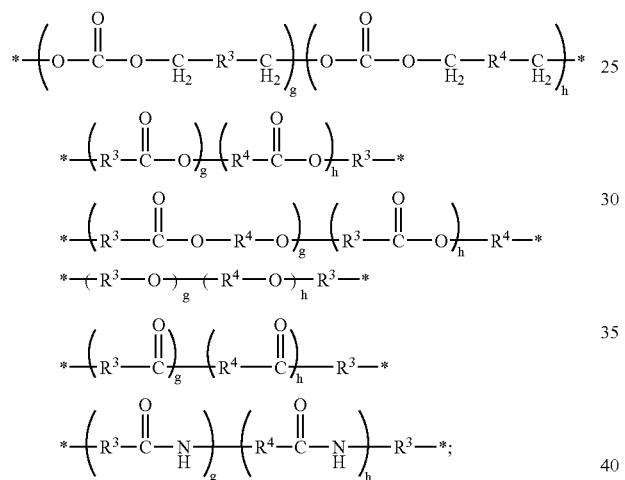

T is a substituent selected from the group consisting of

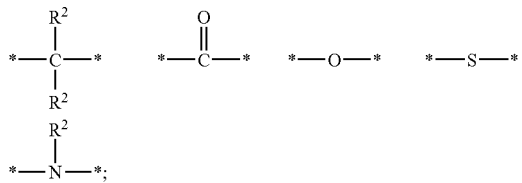

A, if at least one of a=0 and f=1, is a substituent selected from the group consisting of

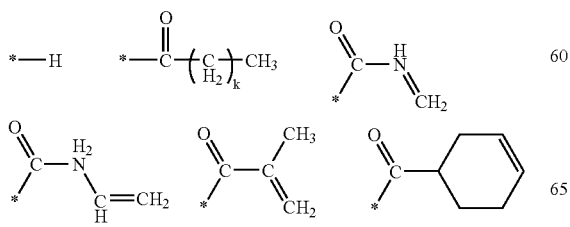

-continued

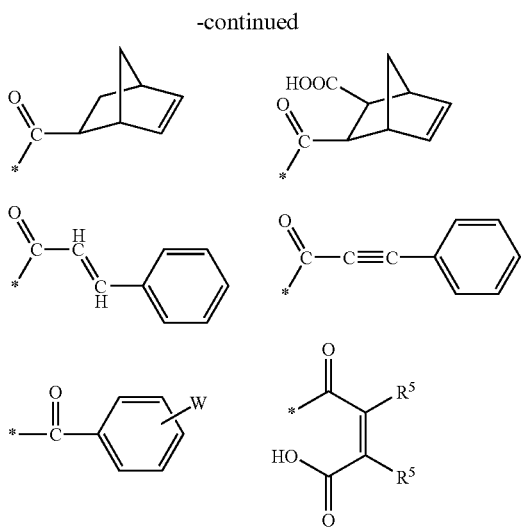

A, if at least one of a=1 and f=0, is a substituent selected from the group consisting of

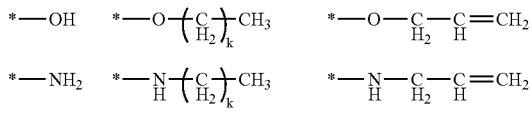

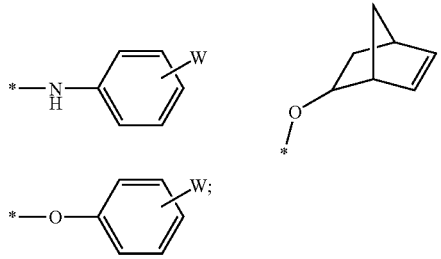

W is a substituent selected from the group consisting of

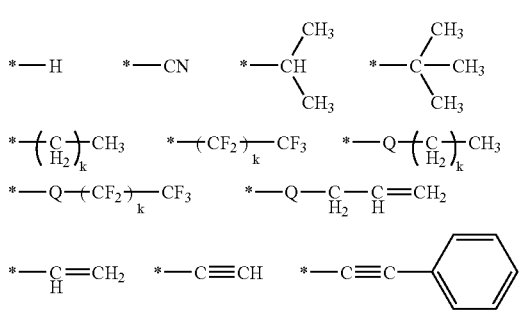

-continued

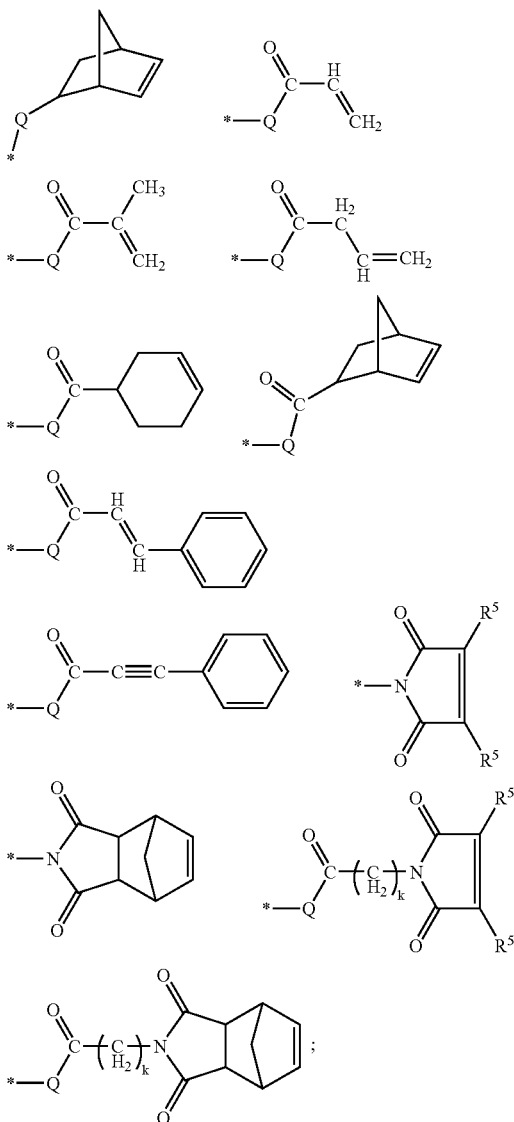

Q is a substituent selected from the group consisting of

*—O—*   *—S—*   *—N(H)—*

$R^1$ is a substituent selected from the group consisting of

*—H   *—(CH$_2$)$_i$—CH$_3$   *—(CH$_2$)$_i$—C$_6$H$_5$

*—C(=O)—O—(CH$_2$)$_i$—CH$_3$

*—C(=O)—O—(CH$_2$)$_i$—C$_6$H$_5$ ;

$R^2$ is a substituent selected from the group consisting of —H, an alkyl group having from 1 to 10 carbon atoms, an aryl group, and a heteroaryl group;

$R^3$ and $R^4$, in each case independently, are substituents selected from the group consisting of a substituted alkylene, an unsubstituted alkylene, arylene, and cycloalkylene group;

$R^5$ is a substituent selected from the group consisting of

$R^6$ is a substituent selected from the group consisting of —H, —CF$_3$, —OH, —SH, —COOH, —N(R$^2$)$_2$, an alkyl group, aryl group, a heteroaryl group, and -continued

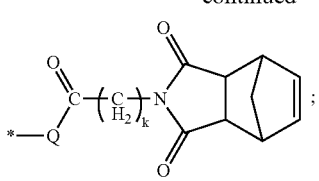

R[7] is a substituent selected from the group consisting of —O—, —CO—, —NR[4]—, —S—, —SO$_2$—, —CH$_2$—, —S$_2$—, and

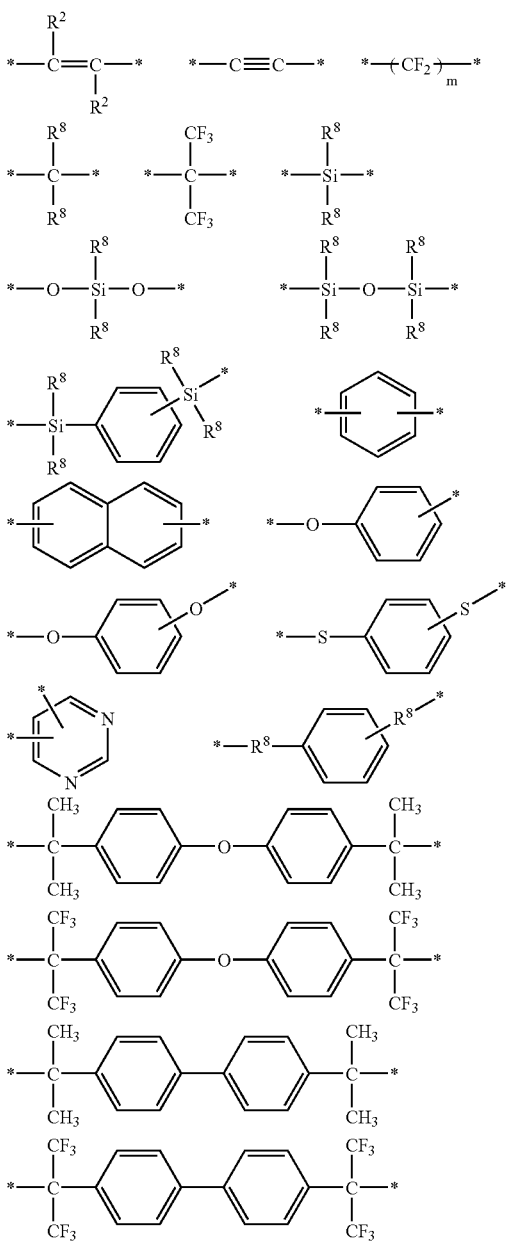

R[8] is a substituent selected from the group consisting of an alkyl group having from 1 to 10 carbon atoms, an aryl group, and a heteroaryl group;

a is an integer from 0 to 1;
b is an integer from 1 to 200;
c is an integer from 0 to 200;
d is an integer from 0 to 50;
e is an integer from 0 to 50;
f is an integer from 0 to 1;
g is an integer from 0 to 100;
h is an integer from 0 to 100;
i is an integer from 0 to 10;
k is an integer from 0 to 10;
l is an integer from 1 to 10;
m is an integer from 1 to 10;
g and h are not simultaneously 0; and
l is an integer from 0 to 10 when R[7] is —CH$_2$—.

8. A process for preparing a poly-o-hydroxyamide having a formula I

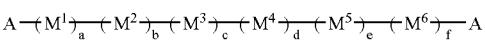

wherein

M[1] is

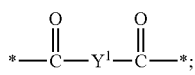

M[2] is

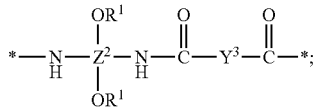

M[3], M[4], and M[5], in each case independently, are monomers selected from the group consisting of

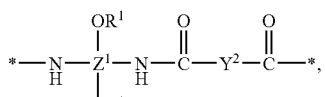

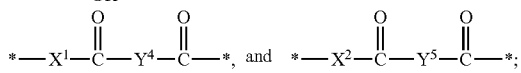

M[6] is

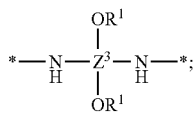

$Z^2$ is a substituent selected from the group consisting of
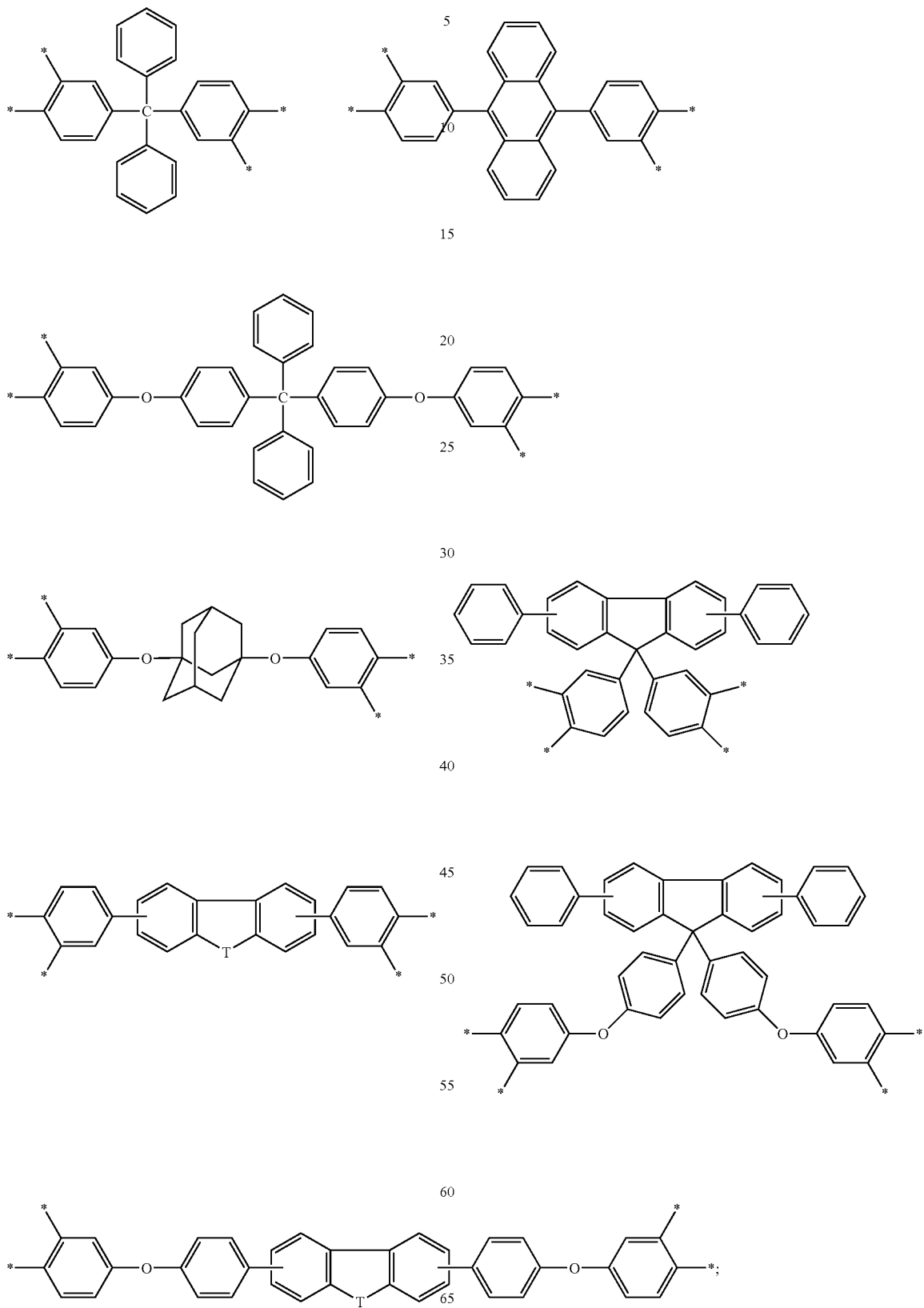

$Z^1$ and $Z^3$, in each case independently, are substituents selected from the group stated for $Z^2$, the group further consisting of
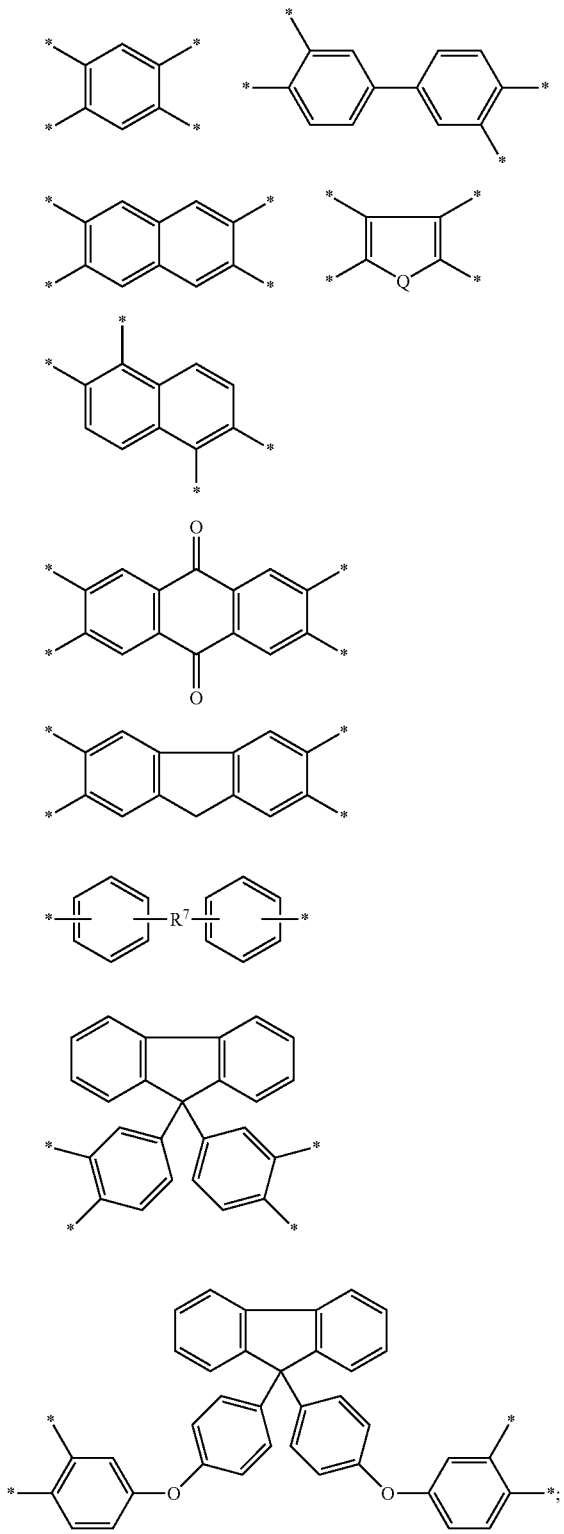
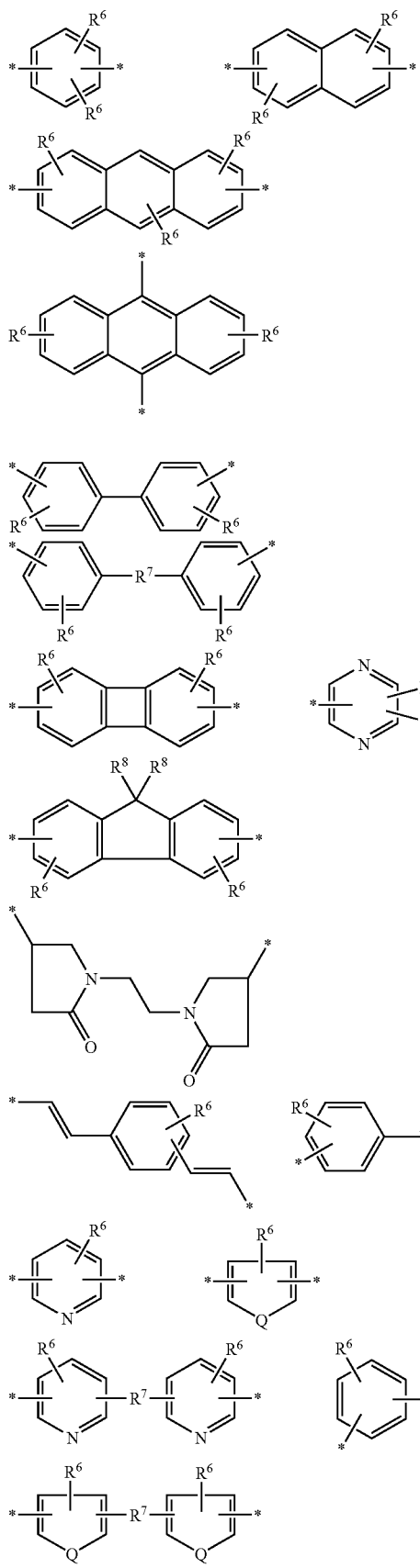
$Y^1$, $Y^2$, $Y^3$, $Y^4$, and $Y^5$ are substituents selected from the group consisting of

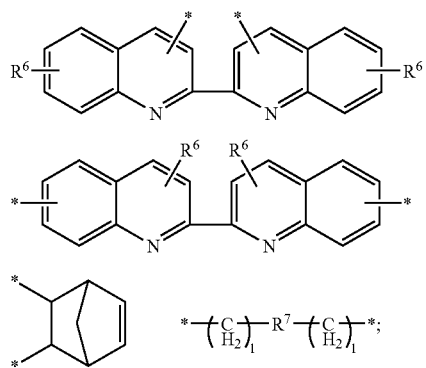

$X^1$ and $X^2$, in each case independently, are substituents selected from the group consisting of:

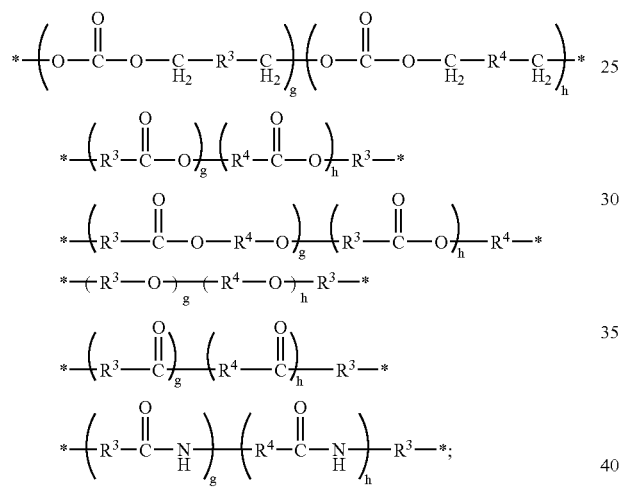

T is a substituent selected from the group consisting of

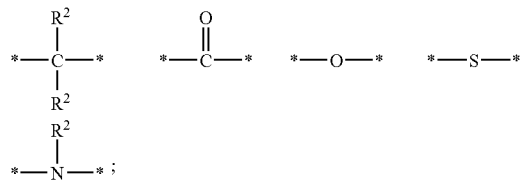

A, if at least one of a=0 and f=1, is a substituent selected from the group consisting of

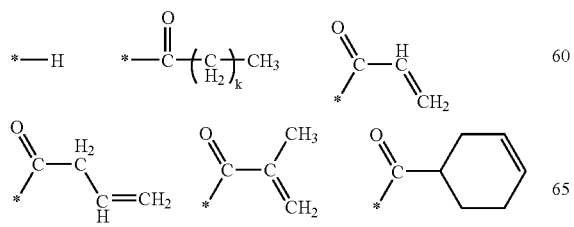

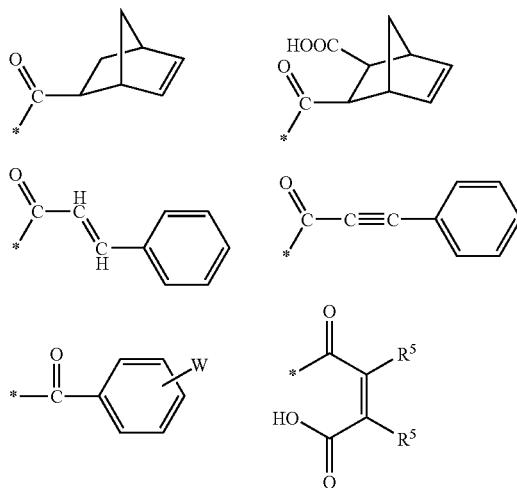

A, if at least one of a=1 and f=0, is a substituent selected from the group consisting of

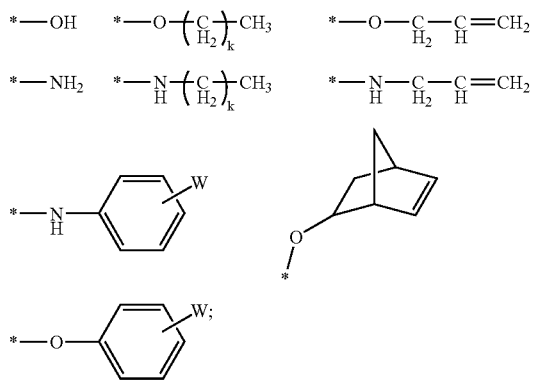

W is a substituent selected from the group consisting of

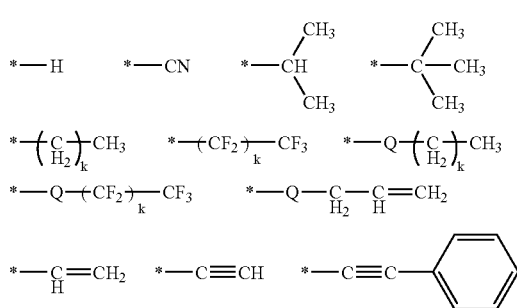

-continued

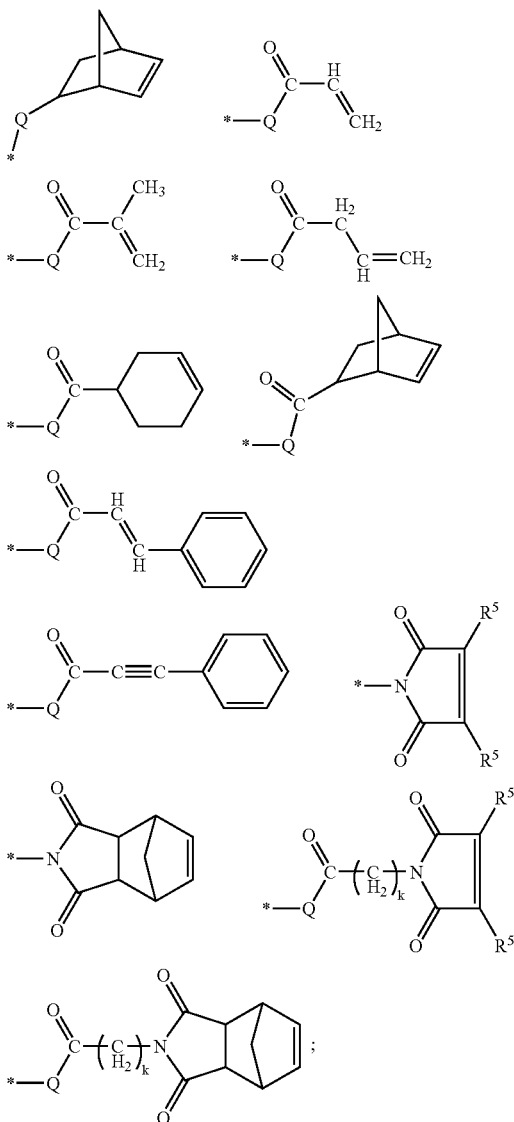

Q is a substituent selected from the group consisting of

R¹ is a substituent selected from the group consisting of $R^2$ is a substituent selected from the group consisting of —H, an alkyl group having from 1 to 10 carbon atoms, an aryl group, and a heteroaryl group;

$R^3$ and $R^4$, in each case independently, are substituents selected from the group consisting of a substituted alkylene, an unsubstituted alkylene, arylene, and cycloalkylene group;

$R^5$ is a substituent selected from the group consisting of

$R^6$ is a substituent selected from the group consisting of —H, —$CF_3$, —OH, —SH, —COOH, —$N(R^2)_2$, an alkyl group, aryl group, a heteroaryl group, and -continued

*—Q—C(=O)—O—(CH₂)_k—N[norbornene-dicarboximide];

R⁷ is a substituent selected from the group consisting of
—O—, —CO—, —NR⁴—, —S—, —SO₂—, —CH₂—, —S₂—, and

[structures: *—C(R²)=C(R²)—*, *—C≡C—*, *—(CF₂)_m—*,
*—C(R⁸)(R⁸)—*, *—C(CF₃)(CF₃)—*, *—Si(R⁸)(R⁸)—*,
*—O—Si(R⁸)(R⁸)—O—*, *—Si(R⁸)(R⁸)—O—Si(R⁸)(R⁸)—*,
*—Si(R⁸)(R⁸)—phenyl—Si(R⁸)(R⁸)—*, phenyl,
naphthyl, *—O—phenyl—*, *—O—phenyl—O—*, *—S—phenyl—S—*,
pyrimidine, *—R⁸—phenyl—R⁸—*,
*—C(CH₃)(CH₃)—phenyl—O—phenyl—C(CH₃)(CH₃)—*,
*—C(CF₃)(CF₃)—phenyl—O—phenyl—C(CF₃)(CF₃)—*,
*—C(CH₃)(CH₃)—biphenyl—C(CH₃)(CH₃)—*,
*—C(CF₃)(CF₃)—biphenyl—C(CF₃)(CF₃)—*;]

R⁸ is a substituent selected from the group consisting of an alkyl group having from 1 to 10 carbon atoms, an aryl group, and a heteroaryl group;

a is an integer from 0 to 1;
b is an integer from 1 to 200;
c is an integer from 0 to 200;
d is an integer from 0 to 50;
e is an integer from 0 to 50;
f is an integer from 0 to 1;
g is an integer from 0 to 100;
h is an integer from 0 to 100;
i is an integer from 0 to 10;
k is an integer from 0 to 10;
l is an integer from 1 to 10;
m is an integer from 1 to 10;
g and h are not simultaneously 0; and
l is an integer from 0 to 10 when R⁷ is —CH₂—;
the method which comprises:
reacting a monomer having a formula II $$H_2N-Z(OR^1)(OR^1)-NH_2,$$ Formula II Z corresponding to one of $Z^1$, $Z^2$, and $Z^3$,
with at least one of a dicarboxylic acid and an activated dicarboxylic acid derivative having a formula III $$L-C(=O)-Y-C(=O)-L,$$ Formula III L being a substituent selected from the group consisting of a hydroxyl group and an activating group;
Y being one of $Y^1$, $Y^2$, $Y^3$, $Y^4$, and $Y^5$.

9. The process according to claim 8, which further comprises including a base during the reacting step.

10. A process for preparing a polybenzoxazole, which comprises heating a poly-o-hydroxyamide having a formula I $$A-(M^1)_a-(M^2)_b-(M^3)_c-(M^4)_d-(M^5)_e-(M^6)_f-A$$ Formula I wherein
$M^1$ is $$*-C(=O)-Y^1-C(=O)-*;$$

$M^2$ is $$*-N(H)-Z^2(OR^1)(OR^1)-N(H)-C(=O)-Y^3-C(=O)-*;$$

$M^3$, $M^4$, and $M^5$, in each case independently, are monomers selected from the group consisting of
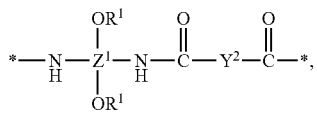
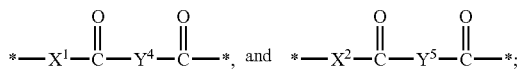
$M^6$ is
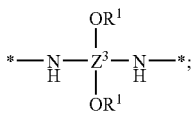
$Z^2$ is a substituent selected from the group consisting of
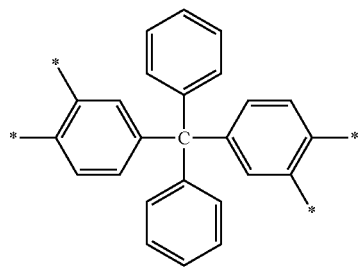
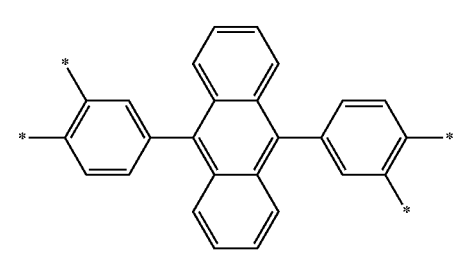
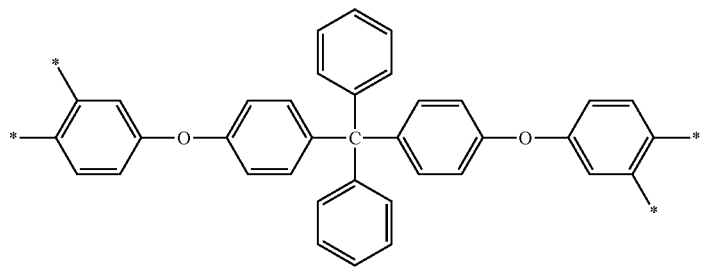
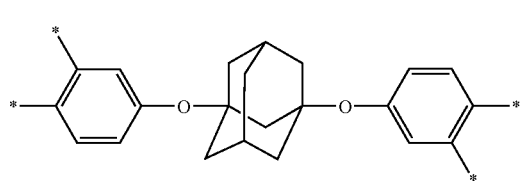
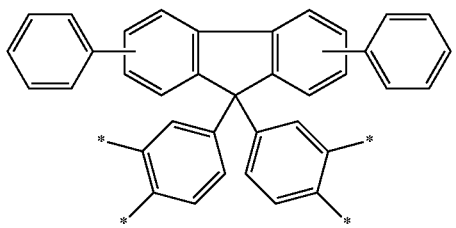
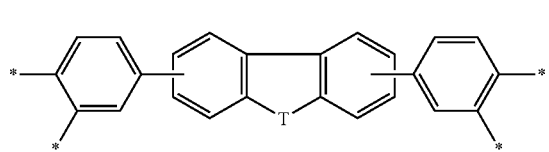
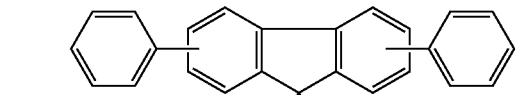
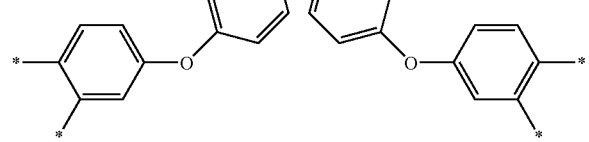
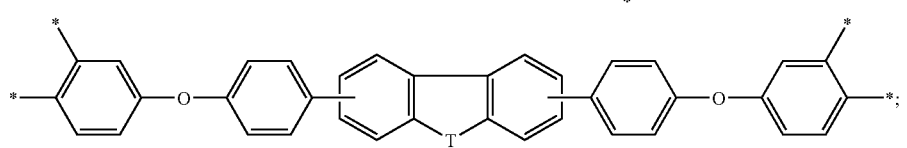

$Z^1$ and $Z^3$, in each case independently, are substituents selected from the group stated for $Z^2$, the group further consisting of
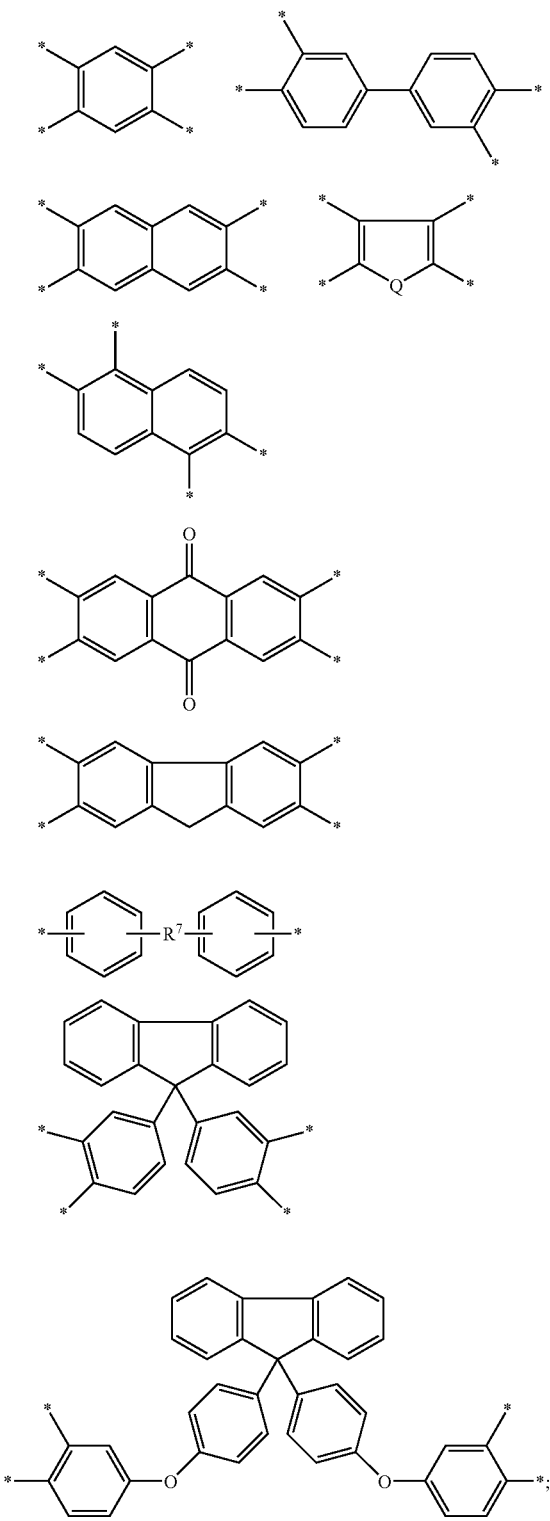
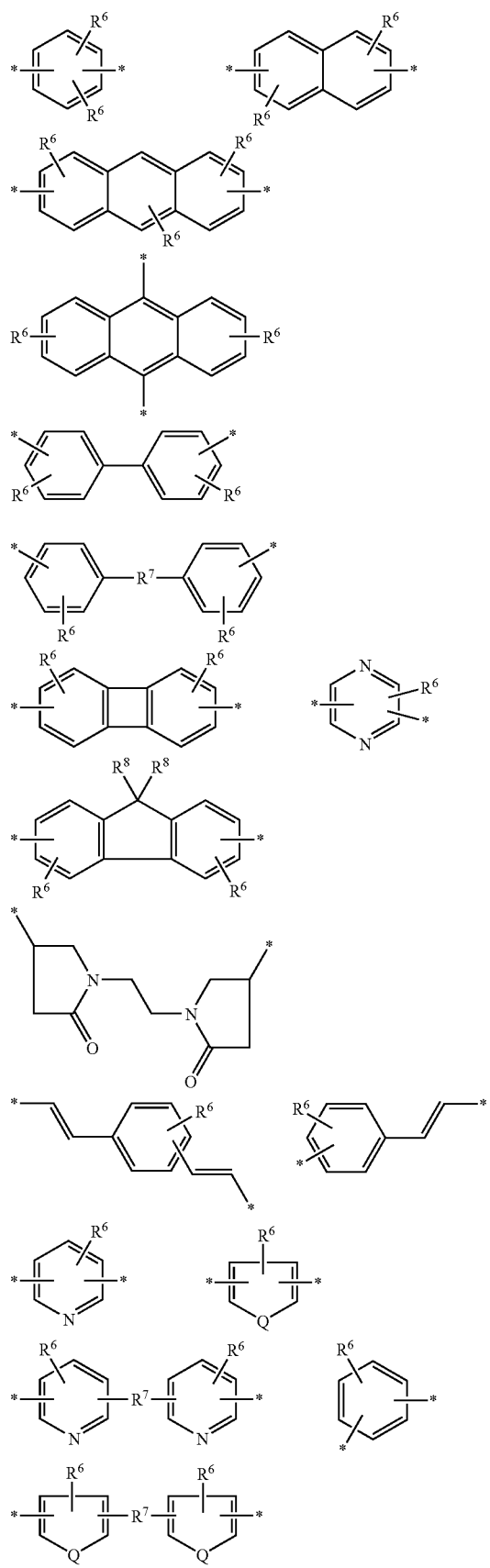
$Y^1$, $Y^2$, $Y^3$, $Y^4$, and $Y^5$ are substituents selected from the group consisting of

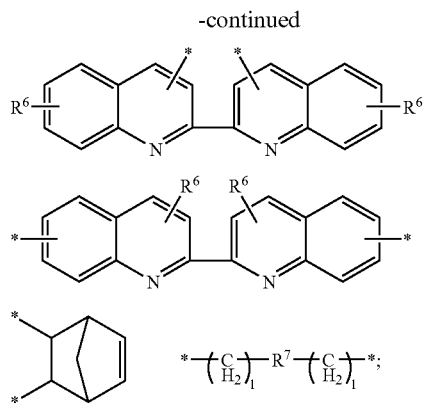

$X^1$ and $X^2$, in each case independently, are substituents selected from the group consisting of:

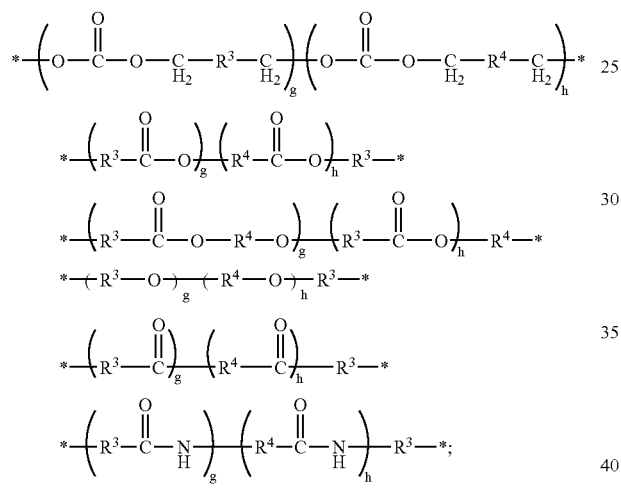

T is a substituent selected from the group consisting of

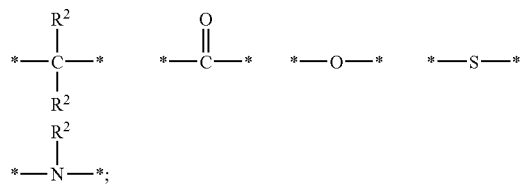

A, if at least one of a=0 and f=1, is a substituent selected from the group consisting of

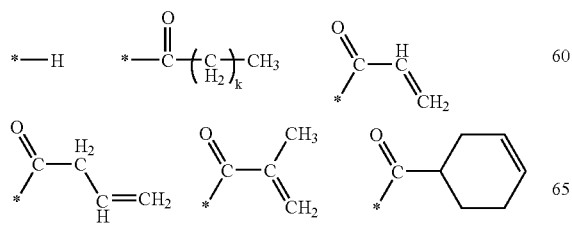

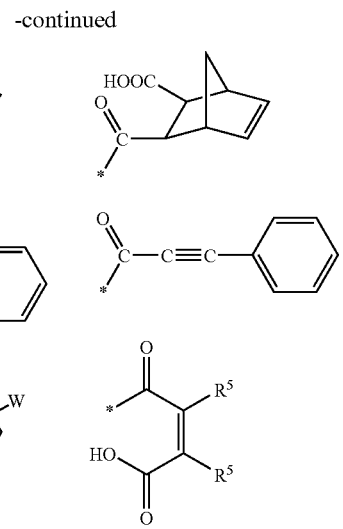

A, if at least one of a=1 and f=0, is a substituent selected from the group consisting of

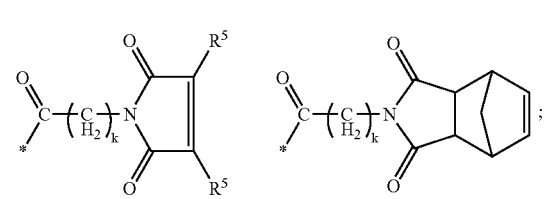

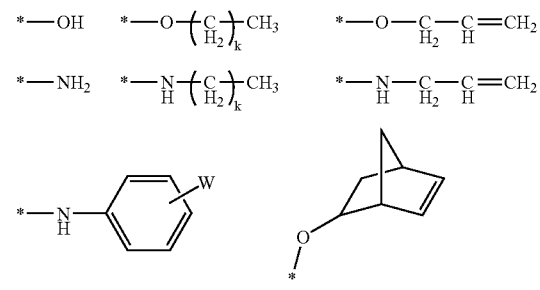

W is a substituent selected from the group consisting of

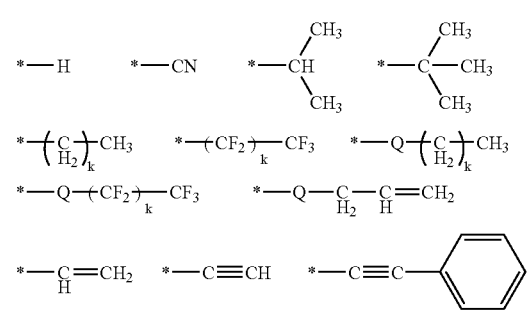

-continued

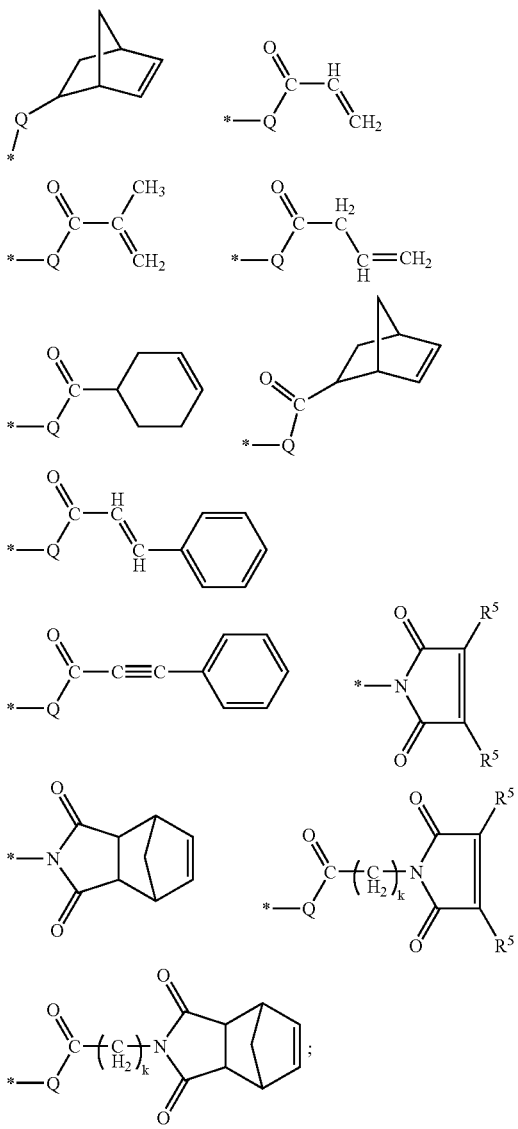

Q is a substituent selected from the group consisting of

*—O—*   *—S—*   *—N(H)—*;

$R^1$ is a substituent selected from the group consisting of $R^2$ is a substituent selected from the group consisting of —H, an alkyl group having from 1 to 10 carbon atoms, an aryl group, and a heteroaryl group;

$R^3$ and $R^4$, in each case independently, are substituents selected from the group consisting of a substituted alkylene, an unsubstituted alkylene, arylene, and cycloalkylene group;

$R^5$ is a substituent selected from the group consisting of

$R^6$ is a substituent selected from the group consisting of —H, —$CF_3$, —OH, —SH, —COOH, —$N(R^2)_2$, an alkyl group, aryl group, a heteroaryl group, and

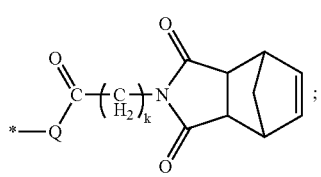

$R^7$ is a substituent selected from the group consisting of —O—, —CO—, —NR$^4$—, —S—, —SO$_2$—, —CH$_2$—, —S$_2$—, and

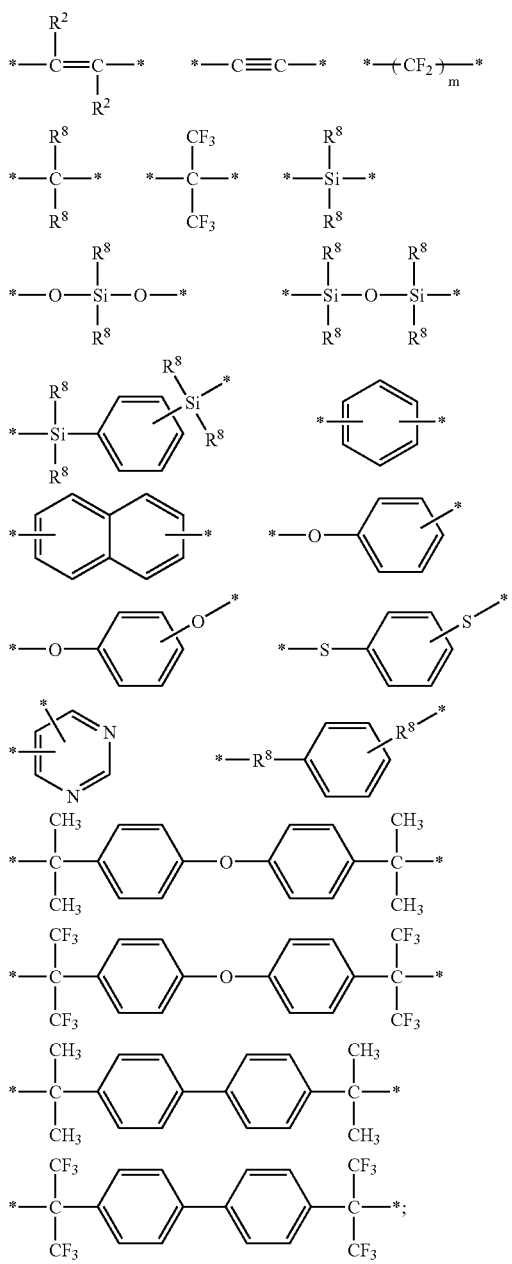

$R^8$ is a substituent selected from the group consisting of an alkyl group having from 1 to 10 carbon atoms, an aryl group, and a heteroaryl group;

a is an integer from 0 to 1;
b is an integer from 1 to 200;
c is an integer from 0 to 200;
d is an integer from 0 to 50;
e is an integer from 0 to 50;
f is an integer from 0 to 1;
g is an integer from 0 to 100;
h is an integer from 0 to 100;
i is an integer from 0 to 10;
k is an integer from 0 to 10;
l is an integer from 1 to 10;
m is an integer from 1 to 10;
g and h are not simultaneously 0; and
l is an integer from 0 to 10 when $R^7$ is —CH$_2$—.

11. An electronic component comprising a dielectric including a polybenzoxazole according to claim 7.

12. A process for producing an electronic component including a polybenzoxazole, which comprises:
preparing, in a solvent, a solution of a poly-o-hydroxyamide having a formula I Formula I

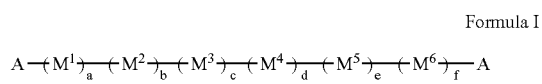

wherein
$M^1$ is

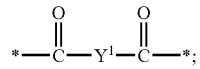

$M^2$ is

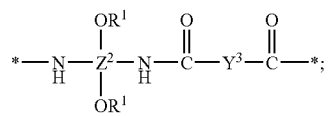

$M^3$, $M^4$, and $M^5$, in each case independently, are monomers selected from the group consisting of

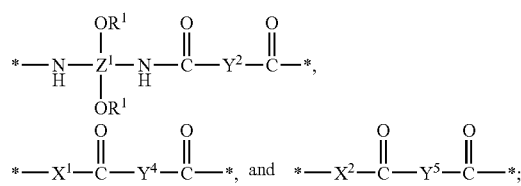

$M^6$ is

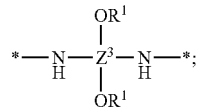

$Z^2$ is a substituent selected from the group consisting of
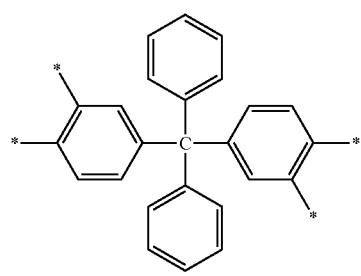
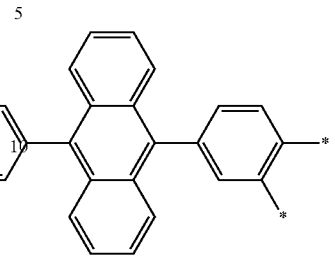
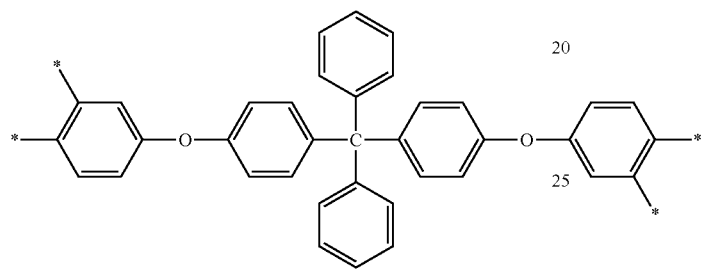
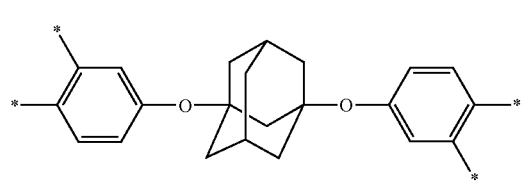
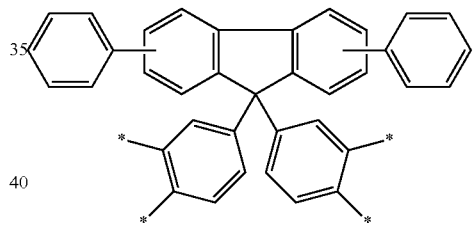
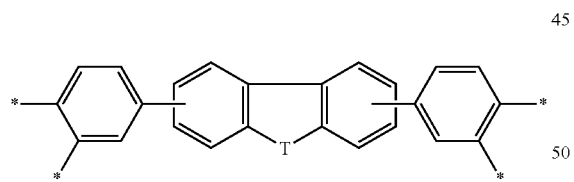
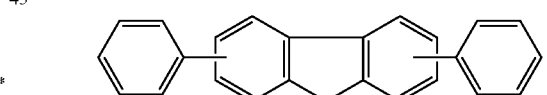
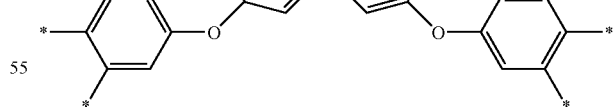
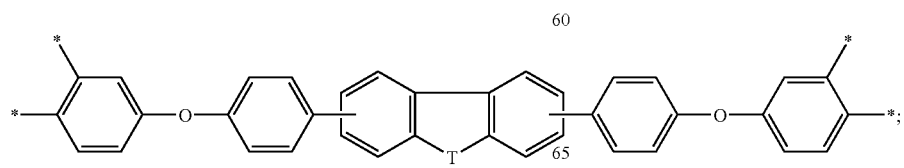

$Z^1$ and $Z^3$, in each case independently, are substituents selected from the group stated for $Z^2$, the group further consisting of
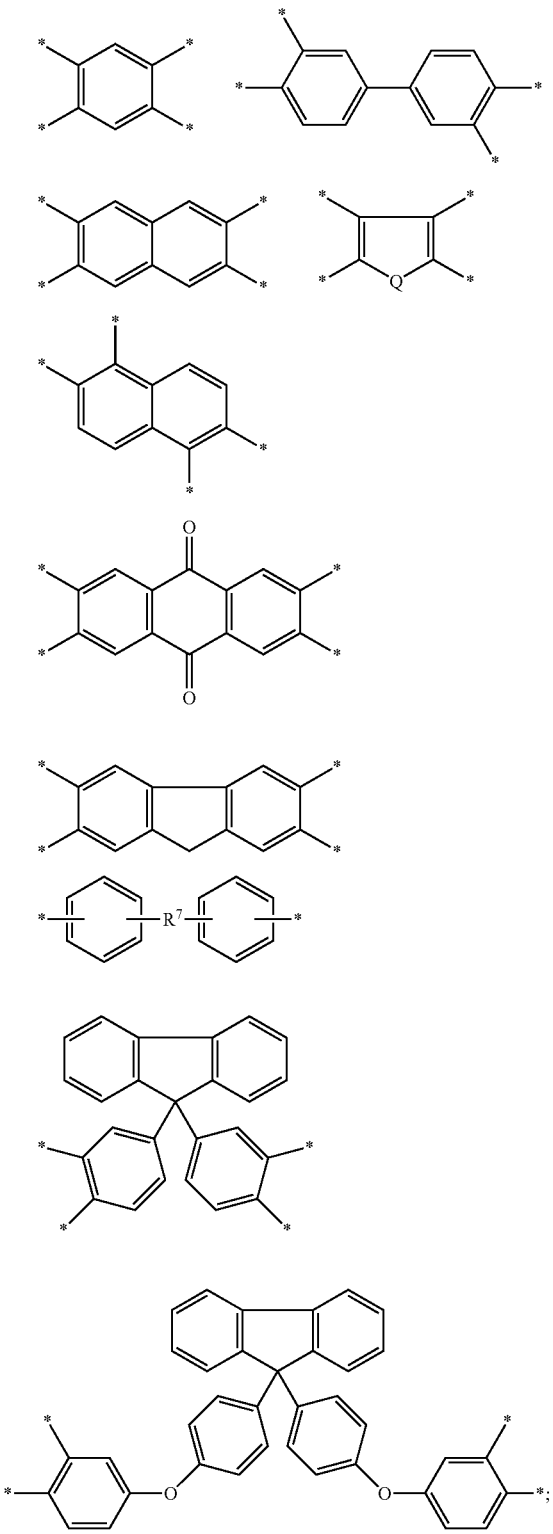
$Y^1$, $Y^2$, $Y^3$, $Y^4$, and $Y^5$ are substituents selected from the group consisting of
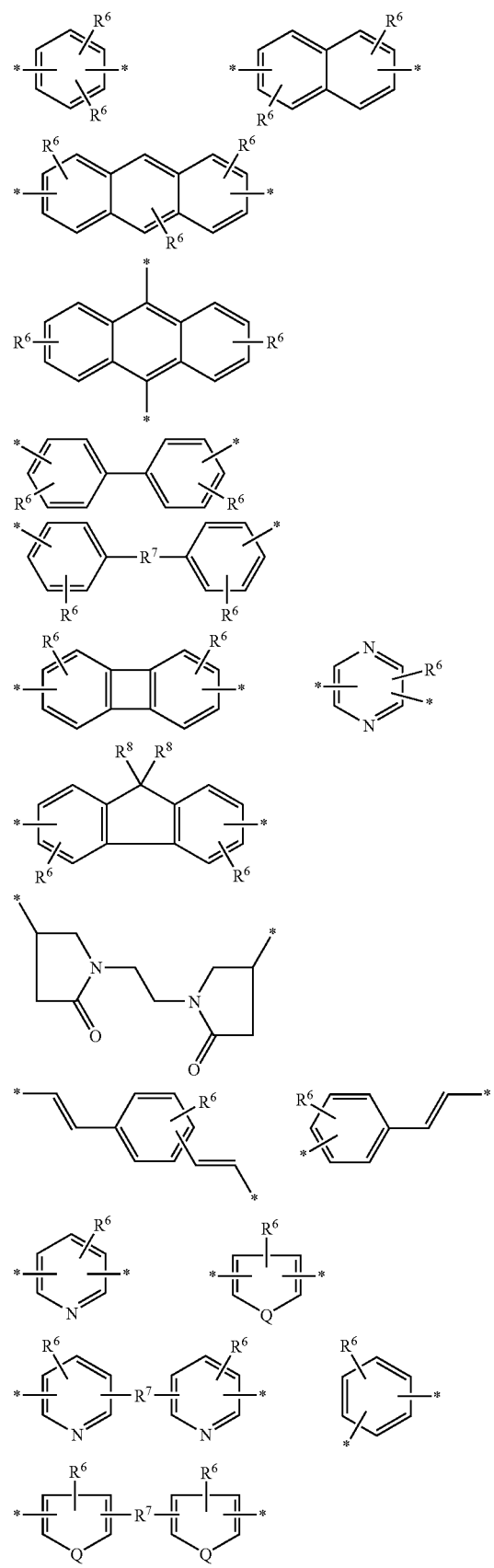

-continued

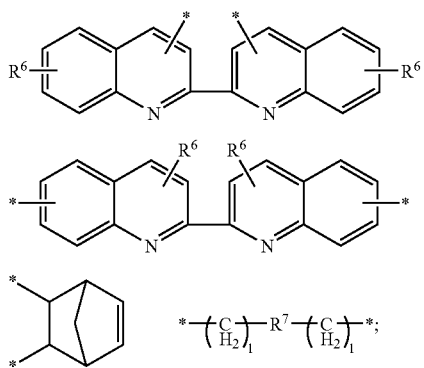

$X^1$ and $X^2$, in each case independently, are substituents selected from the group consisting of:

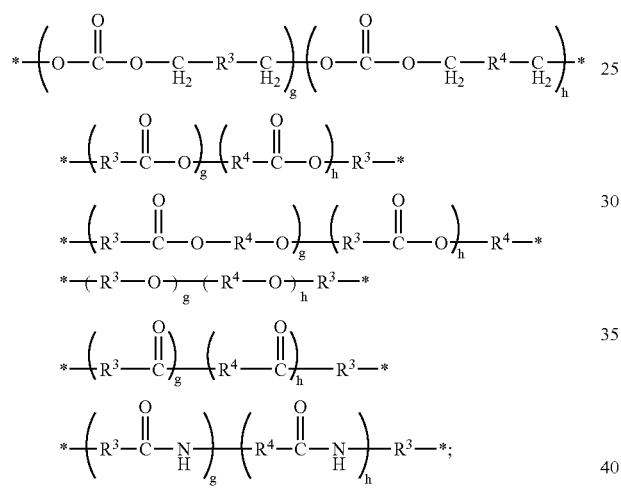

T is a substituent selected from the group consisting of

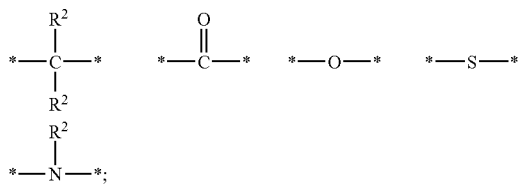

A, if at least one of a=0 and f=1, is a substituent selected from the group consisting of

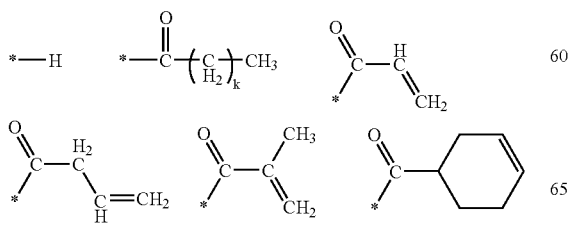

-continued

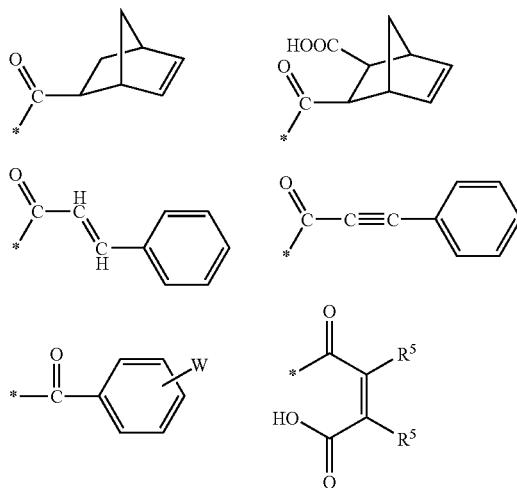

A, if at least one of a=1 and f=0, is a substituent selected from the group consisting of

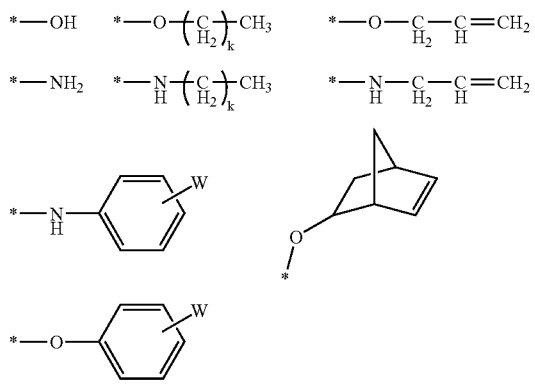

W is a substituent selected from the group consisting of

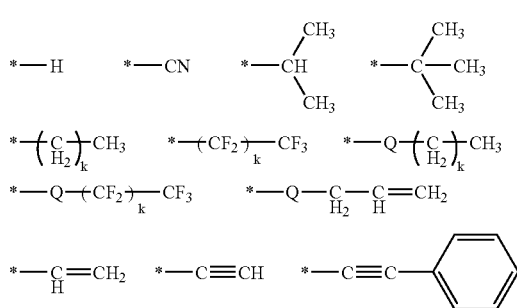

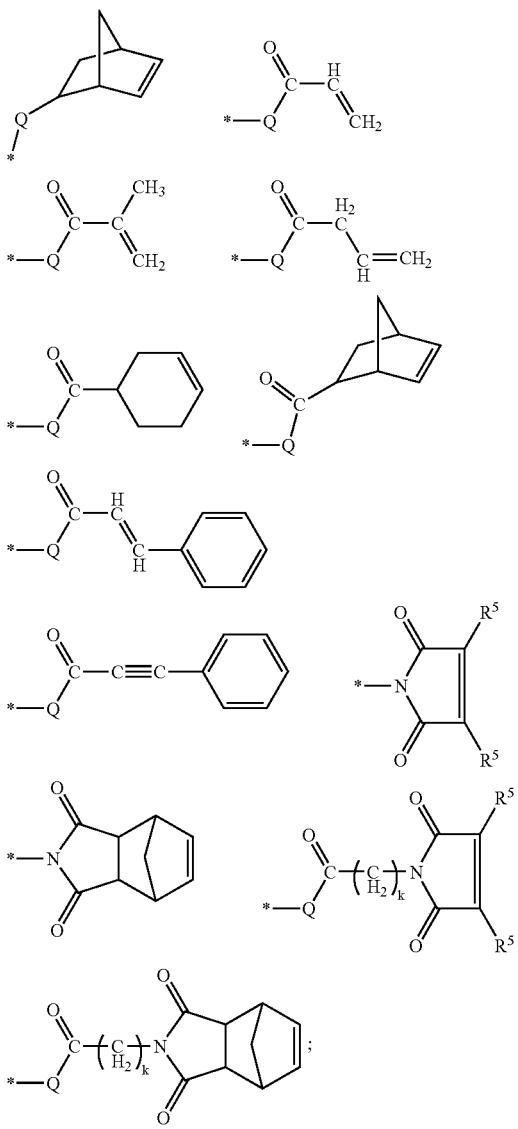

Q is a substituent selected from the group consisting of

*—O—* \*—S—\* \*—N(H)—\*

$R^1$ is a substituent selected from the group consisting of $R^2$ is a substituent selected from the group consisting of —H, an alkyl group having from 1 to 10 carbon atoms, an aryl group, and a heteroaryl group;

$R^3$ and $R^4$, in each case independently, are substituents selected from the group consisting of a substituted alkylene, an unsubstituted alkylene, arylene, and cycloalkylene group;

$R^5$ is a substituent selected from the group consisting of

$R^6$ is a substituent selected from the group consisting of —H, —$CF_3$, —OH, —SH, —COOH, —$N(R^2)_2$, an alkyl group, aryl group, a heteroaryl group, and

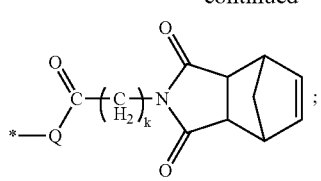

$R^7$ is a substituent selected from the group consisting of —O—, —CO—, —NR$^4$—, —S—, —SO$_2$—, —CH$_2$—, —S$_2$—, and

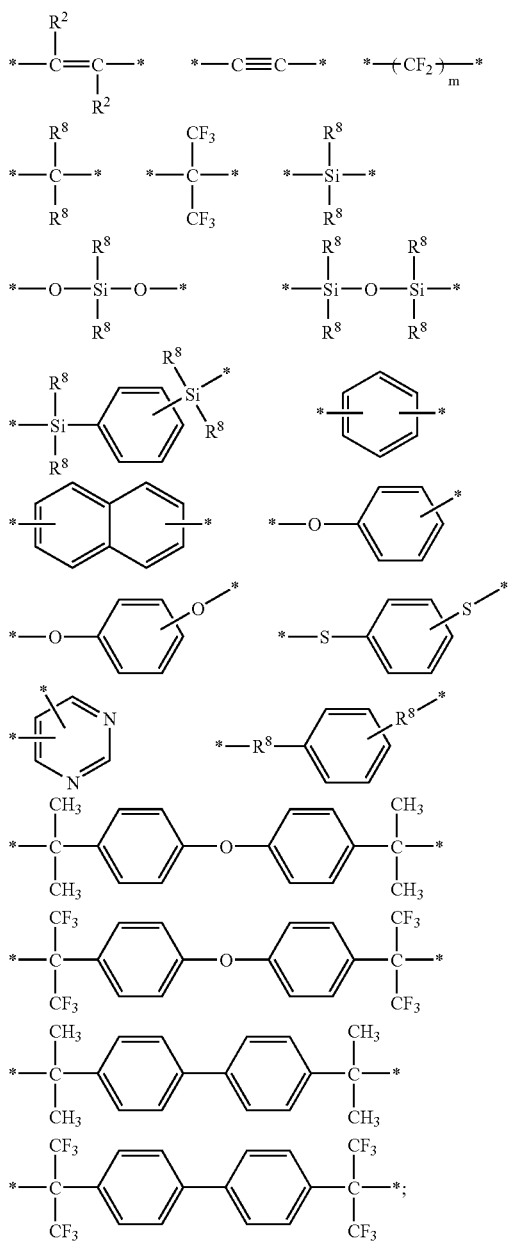

$R^8$ is a substituent selected from the group consisting of an alkyl group having from 1 to 10 carbon atoms, an aryl group, and a heteroaryl group;

a is an integer from 0 to 1;
b is an integer from 1 to 200;
c is an integer from 0 to 200;
d is an integer from 0 to 50;
e is an integer from 0 to 50;
f is an integer from 0 to 1;
g is an integer from 0 to 100;
h is an integer from 0 to 100;
i is an integer from 0 to 10;
k is an integer from 0 to 10;
l is an integer from 1 to 10;
m is an integer from 1 to 10;
g and h are not simultaneously 0; and
l is an integer from 0 to 10 when $R^7$ is —CH$_2$—;

applying the solution to a substrate;
evaporating the solvent to form a film;
heating the film to cyclize the poly-o-hydroxyamide of the formula I to give a polybenzoxazole according to claim 7;
structuring the film to obtain a resist structure having trenches;
depositing a conductive material on the resist structure to fill the trenches the conductive material; and
removing excess conductive material.

13. A process for producing an electronic component including a polybenzoxazole, which comprises:
preparing, in solvent, a solution of a poly-o-hydroxyamide having a formula I Formula I

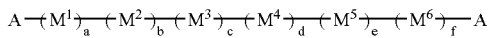

wherein
$M^1$ is

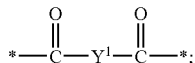

$M^2$ is

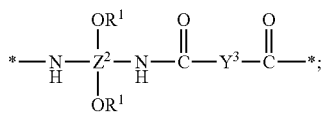

$M^3$, $M^4$, and $M^5$, in each case independently, are monomers selected from the group consisting of

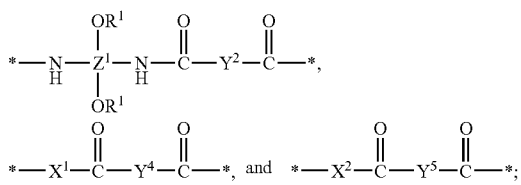

M⁶ is
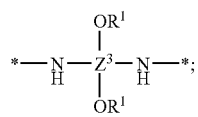
$Z^2$ is a substituent selected from the group consisting of
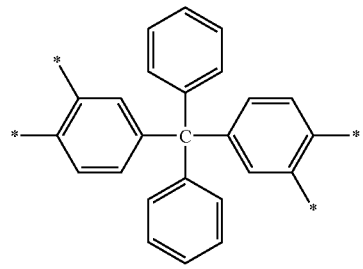 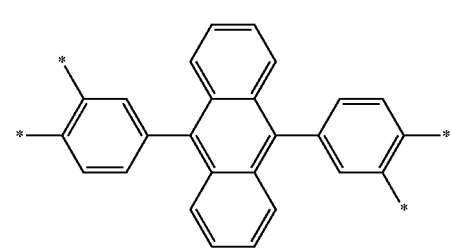
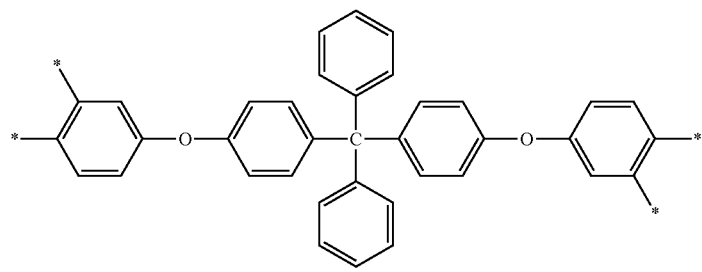
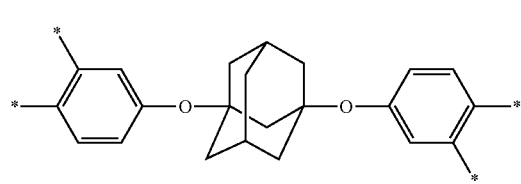 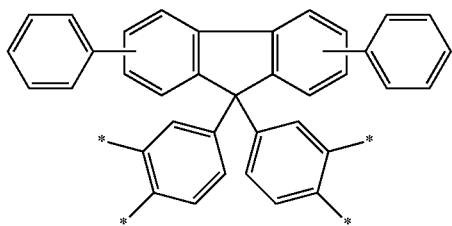
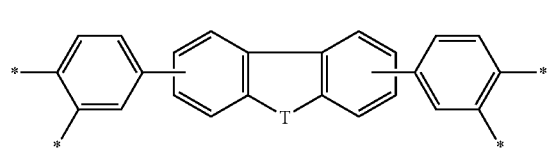 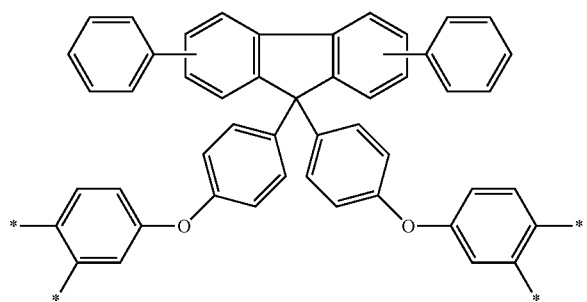
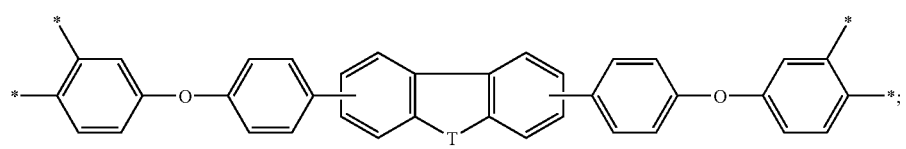

$Z^1$ and $Z^3$, in each case independently, are substituents selected from the group stated for $Z^2$, the group further consisting of
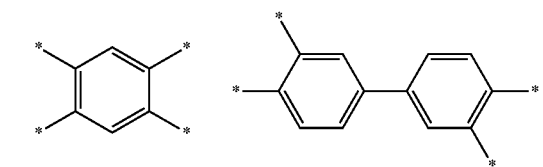
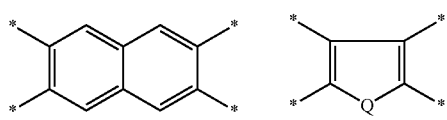
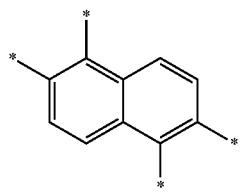
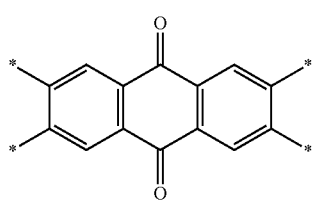
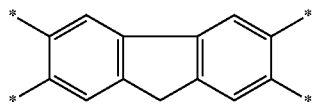
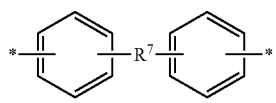
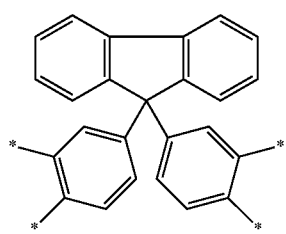
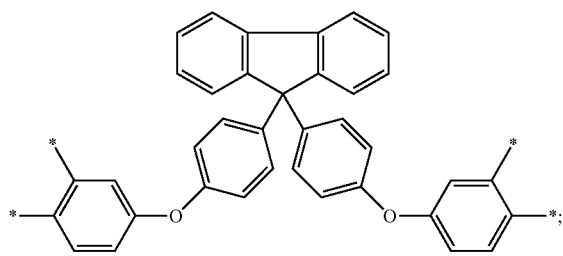
$Y^1$, $Y^2$, $Y^3$, $Y^4$, and $Y^5$ are substituents selected from the group consisting of
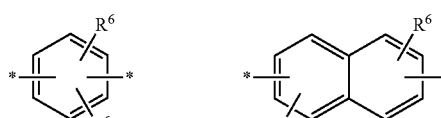
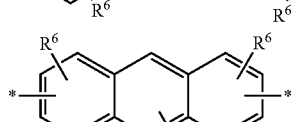
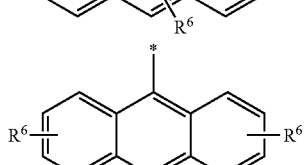
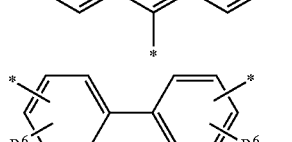
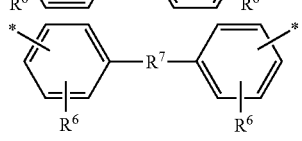
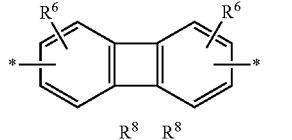
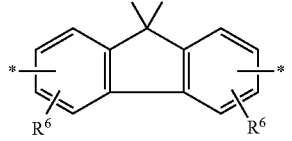
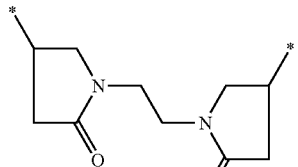
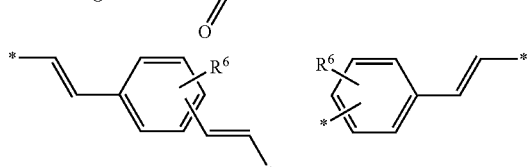
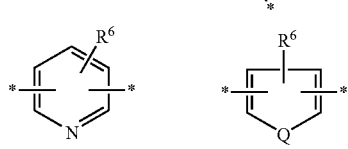
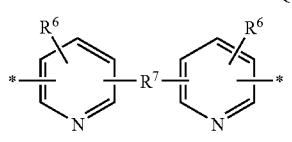
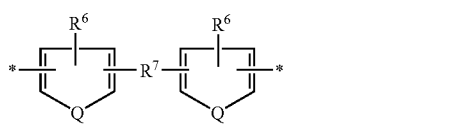

-continued

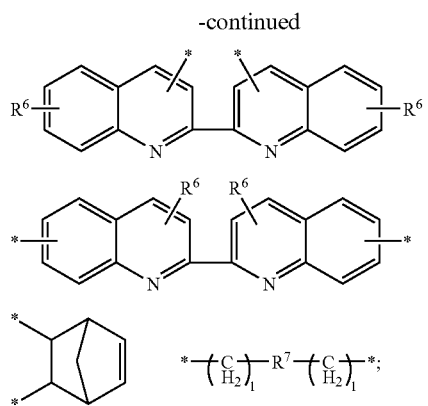

$X^1$ and $X^2$, in each case independently, are substituents selected from the group consisting of:

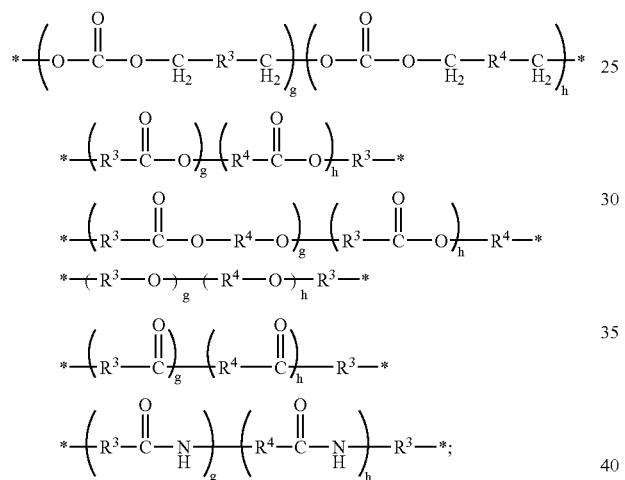

T is a substituent selected from the group consisting of

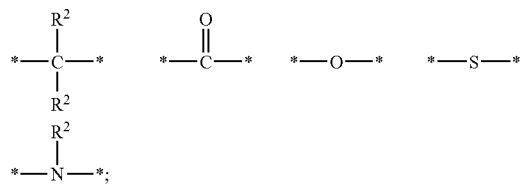

A, if at least one of a=0 and f=1, is a substituent selected from the group consisting of

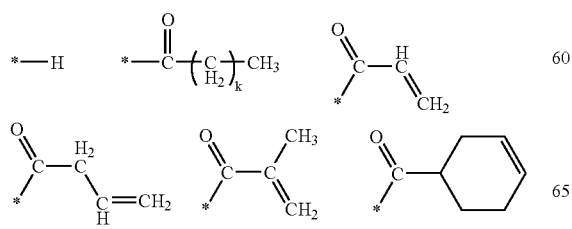

-continued

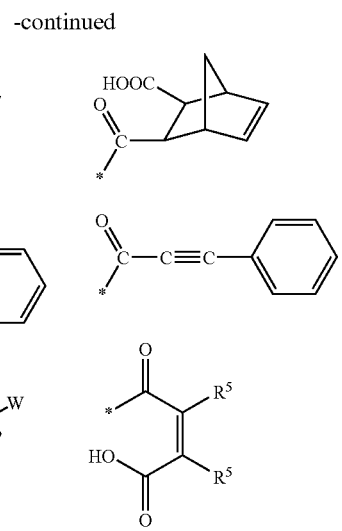

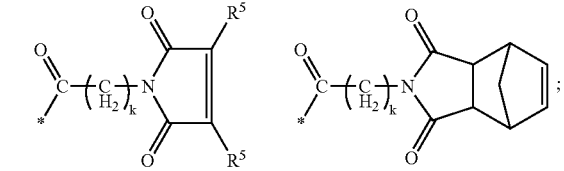

A, if at least one of a=1 and f=0, is a substituent selected from the group consisting of

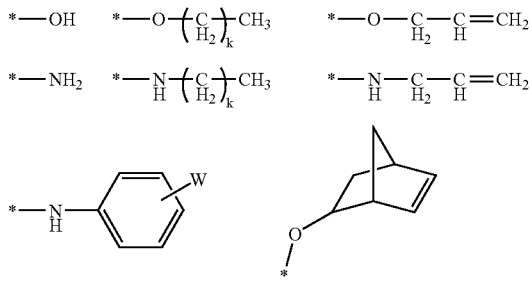

W is a the group consisting of

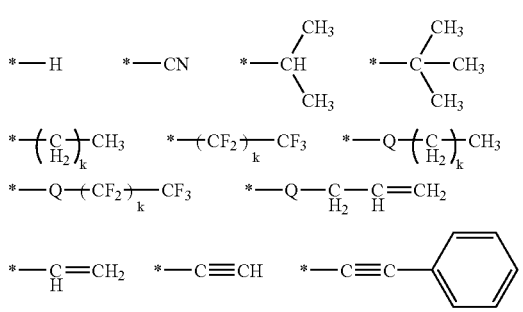

-continued

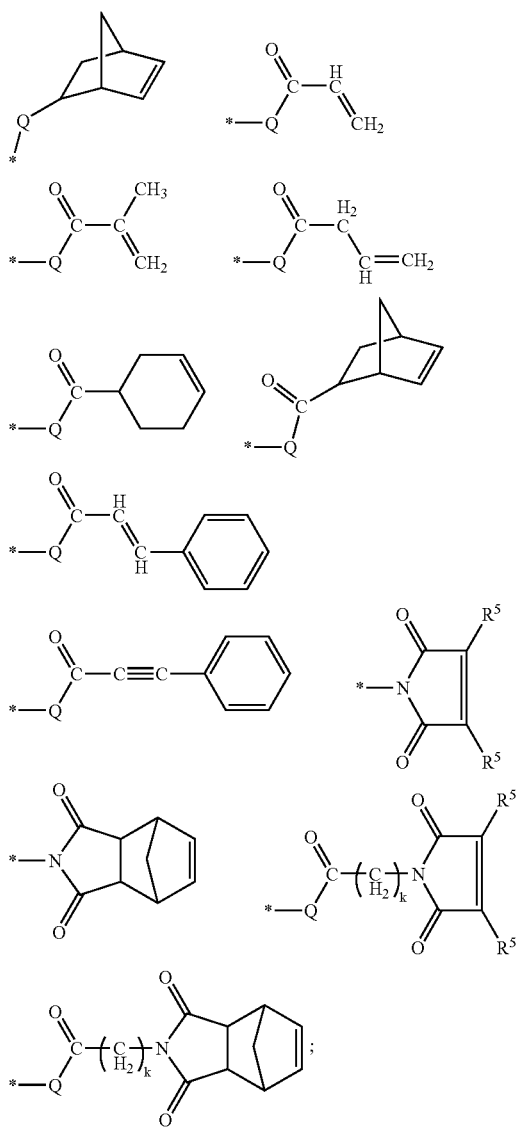

Q is a substituent selected from the group consisting of

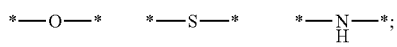

R¹ is a substituent selected from the group consisting of

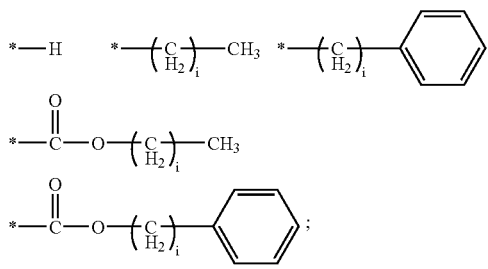

$R^2$ is a substituent selected from the group consisting of —H, an alkyl group having from 1 to 10 carbon atoms, an aryl group, and a heteroaryl group;

$R^3$ and $R^4$, in each case independently, are substituents selected from the group consisting of a substituted alkylene, an unsubstituted alkylene, arylene, and cycloalkylene group; $R^5$ is a substituent selected from the group consisting of

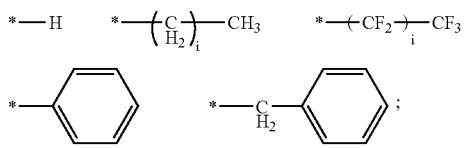

$R^6$ is a substituent selected from the group consisting of —H, —$CF_3$, —OH, —SH, —COOH, —N($R^2$)$_2$, an alkyl group, aryl group, a heteroaryl group, and

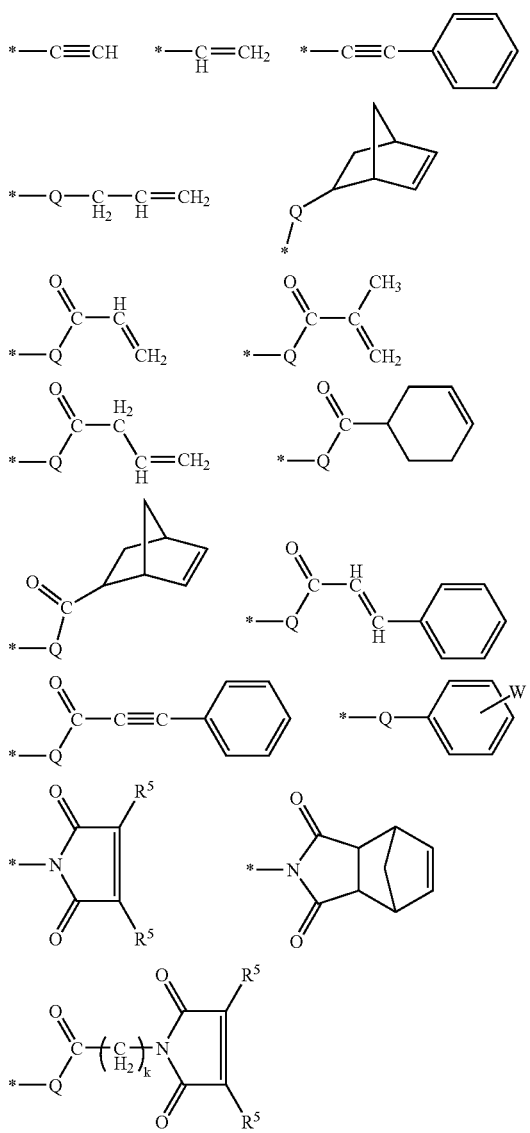

-continued

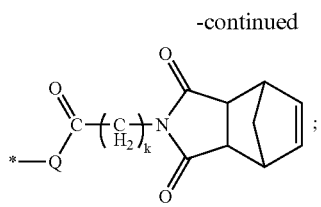

R[7] is a substituent selected from the group consisting of —O—, —CO—, —NR[4]—, —S—, —SO$_2$—, —CH$_2$—, —S$_2$—, and

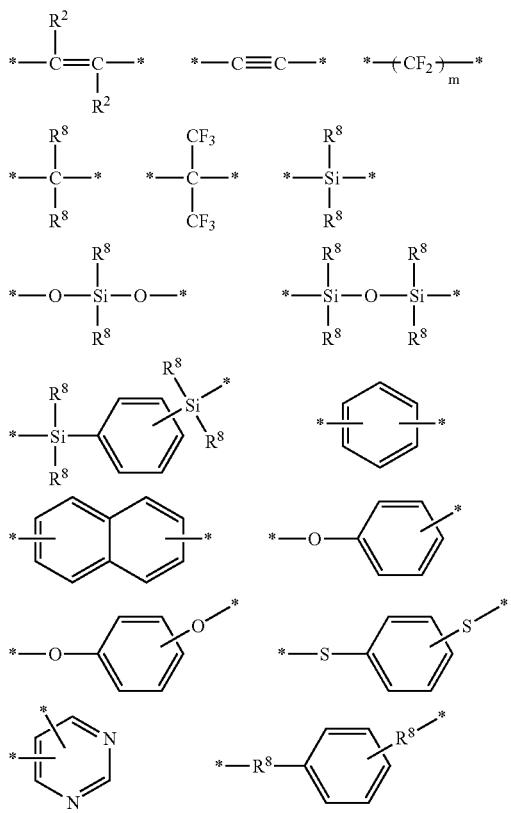

-continued

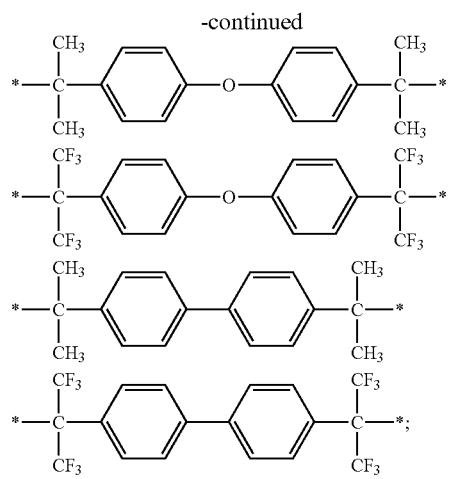

R[8] is a substituent selected from the group consisting of an alkyl group having from 1 to 10 carbon atoms, an aryl group, and a heteroaryl group;
a is an integer from 0 to 1;
b is an integer from 1 to 200;
c is an integer from 0 to 200;
d is an integer from 0 to 50;
e is an integer from 0 to 50;
f is an integer from 0 to 1;
g is an integer from 0 to 100;
h is an integer from 0 to 100;
i is an integer from 0 to 10;
k is an integer from 0 to 10;
l is an integer from 1 to 10;
m is an integer from 1 to 10;
g and h are not simultaneously 0; and
l is an integer from 0 to 10 when R[7] is —CH$_2$—;
applying the solution to a substrate, the substrate having a surface with metallic structures and trenches between the metallic structures;
evaporating the solvent to fill the trenches with the poly-o-hydroxyamide having the formula I;
heating the substrate to cyclize the poly-o-hydroxyamide of the formula I to yield the polybenzoxazole according to claim 4.

\* \* \* \* \*